(12) United States Patent
Takahashi

(10) Patent No.: US 9,090,288 B2
(45) Date of Patent: Jul. 28, 2015

(54) SHEET MATERIAL HAVING A CONCAVE-CONVEX PART, AND VEHICLE PANEL AND LAMINATED STRUCTURE USING THE SAME

(75) Inventor: Masaya Takahashi, Aichi-ken (JP)

(73) Assignee: SUMITOMO LIGHT METAL INDUSTRIES, LTD., Tokyo (JP)

( * ) Notice: Subject to any disclaimer, the term of this patent is extended or adjusted under 35 U.S.C. 154(b) by 321 days.

(21) Appl. No.: 13/820,980

(22) PCT Filed: May 19, 2011

(86) PCT No.: PCT/JP2011/061476
§ 371 (c)(1),
(2), (4) Date: Apr. 3, 2013

(87) PCT Pub. No.: WO2012/032814
PCT Pub. Date: Mar. 15, 2012

(65) Prior Publication Data
US 2013/0183498 A1 Jul. 18, 2013

(30) Foreign Application Priority Data

Sep. 8, 2010 (JP) .................................. 2010-200671

(51) Int. Cl.
*B62D 25/00* (2006.01)
*B21D 13/10* (2006.01)
(Continued)

(52) U.S. Cl.
CPC ................ *B62D 25/00* (2013.01); *B21D 13/10* (2013.01); *B21D 47/00* (2013.01); *B62D 25/105* (2013.01);
(Continued)

(58) Field of Classification Search
CPC ........ B62D 25/00; B62D 25/105; B62D 25/10; B21D 13/10; B21D 47/00; E04C 2/326; Y10T 428/24678; Y10T 428/24719; B32B 3/28
See application file for complete search history.

(56) References Cited

U.S. PATENT DOCUMENTS

| 1,074,824 A | 10/1913 | Wadsworth |
| D71,046 S | 9/1926 | Boyd |

(Continued)

FOREIGN PATENT DOCUMENTS

| JP | 9-254955 | 9/1997 |
| JP | 10-166481 | 6/1998 |

(Continued)

OTHER PUBLICATIONS

International Search Report from parent application No. PCT/JP2011/061476.
(Continued)

*Primary Examiner* — Aaron Austin
*Assistant Examiner* — Jasper Saberi
(74) *Attorney, Agent, or Firm* — J-TEK LAW PLLC; Jeffrey D. Tekanic; Scott T. Wakeman

(57) ABSTRACT

A sheet material (1) includes a stiffness-increasing concave-convex part (20). A first reference plane (K1), an intermediate reference plane (K3), and a second reference plane (K2) serve as a reference system. The intermediate reference plane is partitioned by first lattice straight lines (L1), second lattice straight lines (L2), and third lattice straight lines (L3) so as to define hexagonal unit areas (24) and triangular unit areas (25) in the intermediate reference plane. Areas that include a plurality of the hexagonal unit areas and the triangular unit areas are designated as first, second and third reference areas (214, 224, 234), respectively. Combinations thereof constitute new first, second and third reference areas (213, 223, 233), respectively. The concave-convex part includes first areas (21) and second areas (22), which respectively include the new first reference areas and the new second reference areas, and third areas (23), which include the new third reference areas.

20 Claims, 12 Drawing Sheets

(51) Int. Cl.
  *B21D 47/00* (2006.01)
  *E04C 2/32* (2006.01)
  *B62D 25/10* (2006.01)
  *B32B 3/28* (2006.01)

(52) U.S. Cl.
  CPC . *E04C 2/326* (2013.01); *B32B 3/28* (2013.01); *B62D 25/10* (2013.01); *Y10T 428/24678* (2015.01)

(56) References Cited

U.S. PATENT DOCUMENTS

| | | | |
|---|---|---|---|
| 1,957,654 A | 5/1934 | La Brie | |
| 2,380,447 A | 7/1945 | Jungersen | |
| 2,481,046 A | 9/1949 | Scurlock | |
| D173,158 S | 10/1954 | Johnson | |
| 2,699,599 A | 1/1955 | Potchen | |
| D178,569 S | 8/1956 | Hutchinson | |
| 2,858,247 A * | 10/1958 | De Swart | 428/180 |
| D188,648 S | 8/1960 | Cohen et al. | |
| 2,954,838 A | 10/1960 | Nuorivaara | |
| D190,068 S | 4/1961 | Vernon | |
| 3,011,602 A | 12/1961 | Ensrud et al. | |
| 3,096,032 A | 7/1963 | Davis | |
| 3,118,523 A | 1/1964 | Girot | |
| 3,302,359 A | 2/1967 | Alleaume | |
| 3,362,118 A | 1/1968 | Brunner | |
| 3,407,788 A | 10/1968 | Hagmann | |
| 4,146,666 A | 3/1979 | Houtlosser | |
| 4,411,121 A | 10/1983 | Blacklin et al. | |
| 4,588,258 A | 5/1986 | Hoopman | |
| 4,672,780 A | 6/1987 | Lockwood | |
| D313,512 S | 1/1991 | Legare | |
| 5,122,902 A | 6/1992 | Benson | |
| 5,292,027 A | 3/1994 | Lueke | |
| 5,399,406 A | 3/1995 | Matsuo et al. | |
| 5,612,117 A | 3/1997 | Belanger et al. | |
| 5,889,615 A | 3/1999 | Dreyer et al. | |
| 6,120,280 A | 9/2000 | Mimura et al. | |
| 6,136,416 A | 10/2000 | Smith et al. | |
| 6,383,607 B1 | 5/2002 | Shin | |
| 6,824,856 B2 | 11/2004 | Jones | |
| D625,110 S | 10/2010 | Koenig | |
| D673,779 S | 1/2013 | Takahashi | |
| 8,920,908 B2 | 12/2014 | Takahashi | |
| 8,927,089 B2 | 1/2015 | Takahashi | |
| 2007/0015000 A1* | 1/2007 | Burdon | 428/593 |
| 2007/0184144 A1 | 8/2007 | Akishev et al. | |
| 2012/0269998 A1 | 10/2012 | Takahashi | |
| 2013/0108885 A1* | 5/2013 | Takahashi | 428/595 |

FOREIGN PATENT DOCUMENTS

| | | |
|---|---|---|
| JP | 11-501587 | 2/1999 |
| JP | 2960402 B1 | 7/1999 |
| JP | 2000-136720 | 5/2000 |
| JP | 2000-257441 | 9/2000 |
| JP | 2000-288643 | 10/2000 |
| JP | 3332353 | 7/2002 |
| JP | 2002-307117 | 10/2002 |
| JP | 2002-307227 | 10/2002 |
| JP | 2002-321018 | 11/2002 |
| JP | 2003-261070 | 9/2003 |
| JP | 2004-26120 | 1/2004 |
| JP | 2004-106022 | 4/2004 |
| JP | 2004-218232 | 8/2004 |
| JP | 2005-232751 | 9/2005 |
| JP | 2006-137029 | 6/2006 |
| JP | 2006-305999 | 11/2006 |
| JP | 2007-23661 | 2/2007 |
| JP | 2007-55143 | 3/2007 |
| JP | 2007-112356 | 5/2007 |
| JP | 2007301865 A | 11/2007 |
| JP | 2008-180125 | 8/2008 |
| JP | 4388558 | 10/2009 |
| JP | 2009-257342 | 11/2009 |
| JP | 2011-27248 | 2/2011 |
| JP | 2011-101893 | 5/2011 |
| JP | 2011-110847 | 6/2011 |
| JP | 2011-147950 | 8/2011 |
| JP | 2011-156581 | 8/2011 |
| JP | 2011-202350 | 10/2011 |
| JP | 2011-230174 | 11/2011 |
| JP | 2012-30261 | 2/2012 |
| WO | 9628625 | 9/1996 |
| WO | 03/056111 | 7/2003 |
| WO | 2005058521 A | 6/2005 |
| WO | 2007/010868 | 1/2007 |
| WO | 2011/058922 | 5/2011 |
| WO | 2012/008059 | 1/2012 |

OTHER PUBLICATIONS

Non-final Office Action mailed Apr. 1, 2014 in related U.S. Appl. No. 13/809,502.
Non-final Office Action mailed Apr. 22, 2014 in related U.S. Appl. No. 13/979,106.
Non-final Office Action mailed Apr. 23, 2014 in related U.S. Appl. No. 13/979,188.
Communication mailed Dec. 10, 2013 from the European patent application in counterpart EP application No. 10854741, including European Search Opinion, Supplementary European Search Report and examined claims 1-13.
Non-final Office Action mailed Jan. 7, 2014 for related U.S Appl. No. 13/508,822.
Non-final Office Action mailed Feb. 12, 2014 in related U.S. Appl. No. 13/993,492.
English translation of International Preliminary Report on Patentability from parent PCT application No. PCT/JP2011/061476.
Unpublished U.S. Appl. No. 13/809,502.
Non-final Office Action mailed Sep. 16, 2014 for related U.S. Appl. No. 13/508,822.

* cited by examiner

SHEET MATERIAL HAVING A CONCAVE-CONVEX PART, AND VEHICLE PANEL AND LAMINATED STRUCTURE USING THE SAME

CROSS-REFERENCE

This application is the US national stage of International Patent Application No. PCT/JP2011/061476 filed on May 19, 2011, which claims priority to Japanese Patent Application No. 2010-200671, filed on Sep. 8, 2010.

TECHNICAL FIELD

The present invention relates to a sheet material whose stiffness is increased by the formation of a concave-convex part, and to a vehicle panel and a laminated structure that are configured using the same.

BACKGROUND ART

With the aim of reducing the weight of, for example, an automobile, the potential replacement of the material of components comprising steel sheets and the like with a lightweight material such as an aluminum alloy sheet is being studied and implemented. In such a case, assuming that the weight is reduced, it is necessary that the required stiffness be ensured.

To date, studies conducted to increase stiffness without increasing the thickness of the sheet material have provided the sheet material with a concave-convex pattern, and the stiffness has been increased by virtue of the shape.

As an example of implementing a convex-concave shape, one of the components, called a heat insulator, of an automobile is formed of a sheet material. As a material therefor, Patent Document 1 proposes the formation of numerous protruding parts by embossing in order to ensure sufficient stiffness without increasing sheet thickness. In addition, sheet materials have also been proposed (refer to Patent Documents 2-7) that increase stiffness not only in a heat insulator but also in various applications by forming a concave-convex part via embossing and the like.

PRIOR ART LITERATURE

Patent Documents

Patent Document 1
Japanese Patent No. 4388558
Patent Document 2
Japanese Patent No. 3332353
Patent Document 3
Japanese Unexamined Patent Application Publication No. 2000-257441
Patent Document 4
Japanese Unexamined Patent Application Publication No. H09-254955
Patent Document 5
Japanese Unexamined Patent Application Publication No. 2000-288643
Patent Document 6
Japanese Unexamined Patent Application Publication No. 2002-307117
Patent Document 7
Japanese Unexamined Patent Application Publication No. 2002-321018

SUMMARY

A sheet material wherein corrugations, numerous concave-convex parts, and the like are formed is actually stiffer than a flat sheet in which concave-convex parts are not formed. Nevertheless, the stiffness of a sheet material provided with a corrugated shape has directionality, namely, there are cases wherein even though the stiffness increases in one direction, the desired stiffness increase effect is not obtained in another direction. In addition, in the sheet material provided with the concave-convex part described in Patent Document 1, Patent Document 2, and the like, even though stiffness anisotropy is reduced, the stiffness increase effect thereof is approximately only two times and the weight reduction effect thereof is approximately only 20% of a flat sheet wherein the concave-convex part is not formed, and these effects cannot necessarily satisfy the demand. Consequently, it cannot be said that the optimal concave-convex part shape that both increases stiffness and reduces weight has yet been elucidated, and there is always a demand for further increases in the stiffness increase effect and the weight reduction effect. In addition, apart from the need to reduce weight, there is also anticipation for a material cost reduction effect; when it comes to a sheet material (i.e., a sheet-shaped material), there is demand for increased stiffness and decreased weight—regardless of the material.

In addition, there is demand for a high degree of stiffness over and above that of the conventional art even for, for example, laminated structures that use a sheet material having a concave-convex part that features a high stiffness increase effect, vehicle panels that incorporate a sheet material having a concave-convex part that features a high stiffness increase effect, and the like.

The present invention was conceived considering this background, and it is an object of the present invention to provide a sheet material that has a concave-convex part pattern and whose stiffness is higher than that of the conventional art, and to provide a vehicle panel and a laminated structure that uses the same.

A first aspect of the invention is a sheet material whose stiffness is increased by the formation of a concave-convex part, wherein three reference planes—namely, a first reference plane, an intermediate reference plane, and a second reference plane, which are three virtual planes that are successively disposed spaced apart and parallel to one another—are used as a reference;

it is assumed that the intermediate reference plane is a plane that is partitioned by a plurality of virtual first lattice straight lines disposed parallel to one another and spaced apart by a prescribed spacing, a plurality of virtual second lattice straight lines inclined by substantially 60° with respect to the first lattice straight lines and disposed parallel to one another and spaced apart by the spacing, and a plurality of virtual third lattice straight lines inclined by substantially 60° with respect to the first lattice straight lines and the second lattice straight lines, disposed parallel to one another and spaced apart by the spacing, and disposed such that the third lattice straight lines pass through the midpoint of each side of minimum unit rhombuses partitioned by the first lattice straight lines and the second lattice straight lines, and thereby hexagonal unit areas and triangular unit areas are spread out in the plane;

an A1 direction is a direction that leads in one direction which is parallel to the first lattice straight lines, an A2 direction is a direction that leads in the reverse direction of the A1 direction, a B1 direction is a direction that is parallel to the second lattice straight lines and forms an angle of 120° with respect to the A1 direction, a B2 direction is a direction that leads in the reverse direction of the B1 direction, a C1 direction is a direction that is parallel to the third lattice straight lines and forms an angle of 120° with respect to both the A1 direction and the B1 direction, and a C2 direction is a direction that leads in the reverse direction of the C1 direction;

a first hexagon is an arbitrary one of the hexagonal unit areas, and a plurality of the first hexagons is disposed such that each of the first hexagons skips two of the hexagonal unit areas in each of the A1, A2, B1, B2, C1, and C2 directions;

first reference areas are dodecagonal areas, each of which comprises four of the hexagonal unit areas and six of the triangular unit areas and is configured by combining one of the first hexagons with two of the adjacent triangular unit areas and one of the adjacent hexagonal unit areas in each of the A1, B1, and C1 directions;

a second hexagon is the hexagonal unit area that, with respect to the hexagonal unit area adjacent the first hexagon in the B1 direction, is further adjacent in the A2 direction, and a plurality of the second hexagons is disposed such that each of the second hexagons skips two of the hexagonal unit areas in each of the A1, A2, B1, B2, C1, and C2 directions;

second reference areas are dodecagonal areas, each of which comprises four of the hexagonal unit areas and six of the triangular unit areas and is configured by combining one of the second hexagons with two of the adjacent triangular unit areas and one of the adjacent hexagonal unit areas in each of the A2, B2, and C2 directions;

third reference areas are dodecagonal areas comprising one of the hexagonal unit areas and six of the triangular unit areas therearound that are interspersed between the first reference areas and the second reference areas;

each new first reference area is an area that is either one of the first reference areas alone or a combination of some of the first reference areas and the third reference areas, each new second reference area is an area that is either one of the second reference areas alone or a combination of some of the second reference areas and the third reference areas, and each new third reference area is one of the third reference areas not included in the new first reference areas and the new second reference areas;

the concave-convex part is provided with first areas, which protrude from the new first reference areas defined in the intermediate reference plane toward the first reference plane, second areas, which protrude from the new second reference areas defined in the intermediate reference plane toward the second reference plane, and third areas, which are formed in the intermediate reference plane based on the new third reference areas defined in the intermediate reference plane;

each of the first areas comprises a first top surface, which is a projection of the new first reference area into the first reference plane at either unity or reduction magnification, and first side surfaces, which connect the contour of the first top surface with the contour of its new first reference area;

each of the second areas comprises a second top surface, which is a projection of the new second reference area into the second reference plane at either unity or reduction magnification, and second side surfaces, which connect the contour of the second top surface with the contour of its new second reference area; and each of the third areas comprises an intermediate surface, which is formed in the intermediate reference plane based on the contour of its new third reference area.

A second aspect of the invention is a sheet material whose stiffness is increased by the formation of a concave-convex part, wherein three reference planes—namely, a first reference plane, an intermediate reference plane, and a second reference plane, which are three virtual planes that are successively disposed spaced apart and parallel to one another—are used as a reference;

it is assumed that the intermediate reference plane is a plane that is partitioned by a plurality of virtual first lattice straight lines disposed parallel to one another and spaced apart by a prescribed spacing, a plurality of virtual second lattice straight lines inclined by substantially 60° with respect to the first lattice straight lines and disposed parallel to one another and spaced apart by the spacing, and a plurality of virtual third lattice straight lines inclined by substantially 60° with respect to the first lattice straight lines and the second lattice straight lines, disposed parallel to one another and spaced apart by the spacing, and disposed such that the third lattice straight lines pass through the midpoint of each side of minimum unit rhombuses partitioned by the first lattice straight lines and the second lattice straight lines, and thereby hexagonal unit areas and triangular unit areas are spread out in the plane;

an A1 direction is a direction that leads in one direction which is parallel to the first lattice straight lines, an A2 direction is a direction that leads in the reverse direction of the A1 direction, a B1 direction is a direction that is parallel to the second lattice straight lines and forms an angle of 120° with respect to the A1 direction, a B2 direction is a direction that leads in the reverse direction of the B1 direction, a C1 direction is a direction that is parallel to the third lattice straight lines and forms an angle of 120° with respect to both the A1 direction and the B1 direction, and a C2 direction is a direction that leads in the reverse direction of the C1 direction;

a first hexagon is an arbitrary one of the hexagonal unit areas, and a plurality of the first hexagons is disposed such that each of the first hexagons skips two of the hexagonal unit areas in each of the A1, A2, B1, B2, C1, and C2 directions;

first reference areas are dodecagonal areas, each of which comprises four of the hexagonal unit areas and six of the triangular unit areas and is configured by combining one of the first hexagons with two of the adjacent triangular unit areas and one of the adjacent hexagonal unit areas in each of the A1, B1, and C1 directions;

a second hexagon is the hexagonal unit area that, with respect to the hexagonal unit area adjacent the first hexagon in the B1 direction, is further adjacent in the A2 direction, and a plurality of the second hexagons is disposed such that each of the second hexagons skips two of the hexagonal unit areas in each of the A1, A2, B1, B2, C1, and C2 directions;

second reference areas are dodecagonal areas, each of which comprises four of the hexagonal unit areas and six of the triangular unit areas and is configured by combining one of the second hexagons with two of the adjacent triangular unit areas and one of the adjacent hexagonal unit areas in each of the A2, B2, and C2 directions;

third reference areas are dodecagonal areas comprising one of the hexagonal unit areas and six of the triangular unit areas therearound that are interspersed between the first reference areas and the second reference areas;

all of the third reference areas are distributed in either or both of the adjacent first reference areas and the adjacent second reference areas;

each new first reference area is an area that is either one of the first reference areas alone or a combination of some or all of the first reference areas and the third reference areas, each new second reference area is an area that is either one of the second reference areas alone or a combination of some or all of the second reference areas and the third reference areas;

the concave-convex part is provided with first areas, which protrude from the new first reference areas defined in the intermediate reference plane toward the first reference plane, second areas, which protrude from the new second reference areas defined in the intermediate reference plane toward the second reference plane;

each of the first areas comprises a first top surface, which is a projection of the new first reference area into the first reference plane at either unity or reduction magnification, and first side surfaces, which connect the contour of the first top surface with the contour of its new first reference area; and each of the second areas comprises a second top surface, which is a projection of the new second reference area into the second reference plane at either unity or reduction magnification, and second side surfaces, which connect the contour of the second top surface with the contour of its new second reference area.

Another aspect of the present invention is a laminated structure wherein multiple sheet materials are laminated, wherein at least one of the sheet materials is a sheet material that has the concave-convex part according to the first or second aspects.

Yet another aspect of the present invention is a vehicle panel that has an outer panel and an inner panel, which is joined to a rear surface of the outer panel, wherein one or both of the outer panel and the inner panel comprises a sheet material that has a concave-convex part according to the first or second aspects.

The sheet material that has the concave-convex part of the first aspect of the invention has the specially shaped concave-convex part. The concave-convex part is provided with: the first areas, which protrude from the new first reference areas defined in the intermediate reference plane toward the first reference plane; the second areas, which protrude from the new second reference areas defined in the intermediate reference plane toward the second reference plane; and the third areas, which are formed in the intermediate reference plane based on the new third reference areas defined in the intermediate reference plane. Furthermore, each of the first areas comprises the first top surface and the first side surfaces, which connect the contour of the first top surface with the contour of its new first reference area; in addition, each of the second areas comprises the second top surface and the second side surfaces, which connect the contour of the second top surface with the contour of its new second reference area. In addition, each of the third areas comprises an intermediate surface, which is formed based on the contour of its new third reference area.

Because it has such a structure, the sheet material has superior bending stiffness and surface stiffness as well as superior energy absorption characteristics.

Although not wishing to be bound by theory, the following provides a possible reason why the stiffness is increased. Namely, the first areas and the second areas comprise the first top surfaces and the second top surfaces, which are disposed at positions spaced apart in the thickness directions of the sheet material, and the first side surfaces and the second side surfaces, which intersect in the thickness directions of the sheet material; furthermore, a large amount of material can be disposed at a position spaced apart from the neutral plane. Consequently, the large amount of material can be used effectively as a strength member, and thereby the stiffness increase effect can be increased greatly.

In addition, the concave-convex part is shaped such that it has a stiffness increase effect in every direction of the surface of the sheet material. Consequently, it is possible to obtain a high stiffness increase effect with extremely low anisotropy. In addition, attendant with the increase in the stiffness, it is also possible to obtain the effect of improving damping characteristics; in addition, the irregular shape makes it possible to obtain the effect of suppressing sound reverberations.

In a sheet material that has the concave-convex part according to the second aspect of the invention, all of the third reference areas are arbitrarily distributed in either or both of the adjacent first reference areas and the adjacent second reference areas. Furthermore, each new first reference area is an area that is either one of the first reference areas alone or a combination of the first reference areas and the third reference areas, each new second reference area is an area that is either one of the second reference areas alone or a combination of the second reference areas and the third reference areas. Furthermore, the concave-convex part is provided with first areas, which protrude from the new first reference areas toward the first reference plane, second areas, which protrude from the new second reference areas toward the second reference plane. Each of the first areas comprises the first top surface and the first side surfaces, which connect the contour of the first top surface with the contour of its new first reference area. Each of the second areas comprises the second top surface and the second side surfaces, which connect the contour of the second top surface with the contour of its new second reference area.

Consequently, the sheet material that has the concave-convex part does not have the intermediate surface; furthermore, a greater amount of the material can be effectively used as a strength member, thereby enhancing the stiffness increase effect. In addition, attendant with the increase in the stiffness, it is also possible to obtain the effect of improving damping characteristics; in addition, the irregular shape makes it possible to obtain the effect of suppressing sound reverberations.

In addition, the concave-convex part is shaped such that it has the stiffness increase effect in every direction of the surface of the sheet material. Consequently, a high stiffness increase effect can be obtained in every direction.

Using the sheet material that has the superior concave-convex part having high stiffness, as mentioned above, in part of the laminated structure makes it possible to easily obtain a laminated structure whose stiffness is extremely high. In addition, it is possible to obtain the effect of improving the damping characteristics attendant with the increase in stiffness, and to obtain the effect of improving the sound absorbing characteristics by virtue of containing air layers.

In the vehicle panel, the sheet material that has the concave-convex part having high stiffness as mentioned above is used, in the outer panel or the inner panel, or both, and thereby it is possible to easily obtain a vehicle panel whose stiffness is extremely high. In addition, it is possible to obtain the effect of improving the damping characteristics attendant with the increase in stiffness, and to obtain the effect of improving the sound absorbing characteristics by virtue of containing air layers.

DETAILED DESCRIPTION OF THE PREFERRED EMBODIMENTS

Figure 1A:
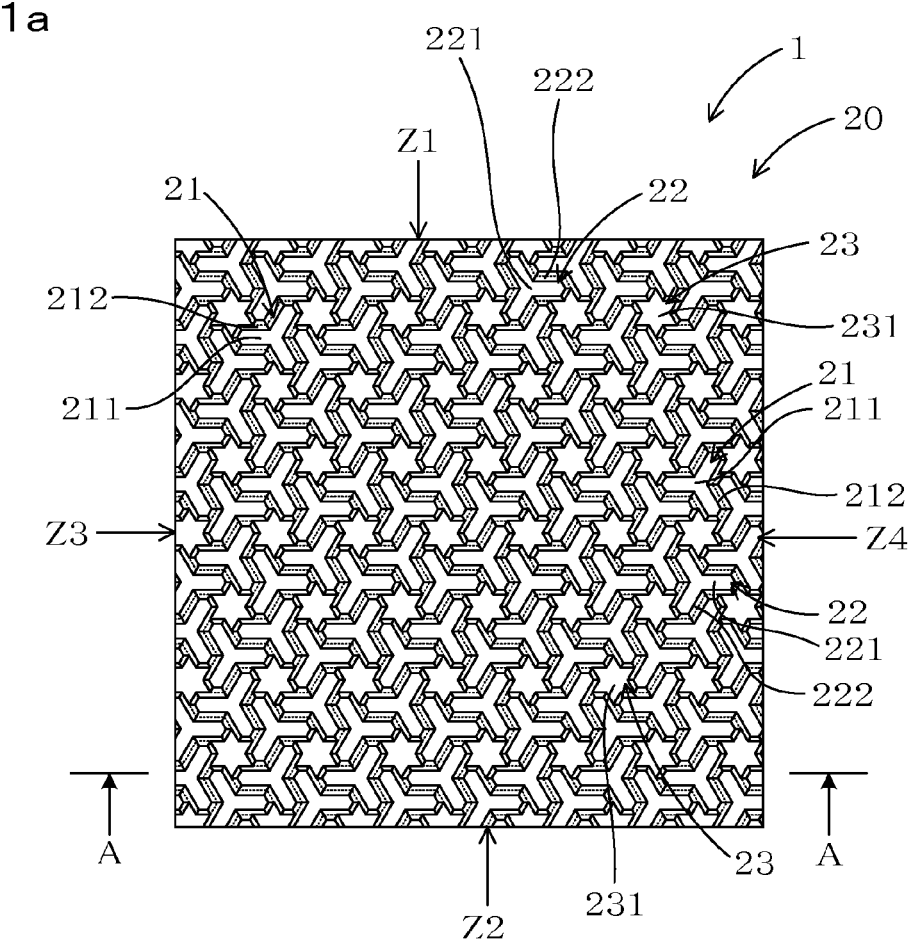
FIG. 1 shows a first embodiment, wherein (a) is a partial plan view of a concave-convex part, and (b) is a partial enlarged view of a cross sectional view taken along the A-A line in (a).

In the present invention, a "dodecagon" refers to a figure that has twelve sides and twelve vertices, wherein the vertices are formed by convex angle shapes or concave angle shapes. In addition, none of the expressions of shape, such as "dodecagon" and "hexagon," are limited to the narrow concepts of geometry but rather include shapes that can be generally recognized as those shapes; for example, shapes that would naturally be allowed include: shapes wherein the sides are somewhat curved; so-called fillets wherein a round and the like needed for a molded shape is created in a corner part, a surface, and the like; and shapes provided with a so-called curvature.

In addition, in the present invention, the expression "parallel" is not limited to the narrow concept of geometry and may be anything that can generally be recognized as being parallel.

In addition, the first top surfaces and the second top surfaces can be configured by surfaces in the first reference plane and surfaces in the second reference plane, respectively, or by regions that protrude from the first reference plane and from the second reference plane in the reverse direction to the intermediate reference plane. Examples of the shape of the protruding regions include a dome, a ridge line, and a cone, but the shape of the protruding regions is not limited thereto.

In addition, each of the new first reference areas is either the first reference area alone or an area that combines the first reference areas and the third reference areas. Consequently, if the first reference areas and the third reference areas are not combined, then the areas described by the new first reference areas and the areas described by the first reference areas are identical. Likewise, each of the new second reference areas is either the second reference area alone or an area that combines the second reference areas and the third reference areas. Consequently, if the second reference areas and the third reference areas are not combined, then the areas described by the new second reference areas and the areas described by the second reference areas are identical. In addition, each of the new third reference areas is the area that comprises the third area not included in the new first reference areas and the new second reference areas. Consequently, if the areas described by the new first reference areas and the areas described the first reference areas are identical and the areas described by the new second reference areas and the areas described by the second reference areas are identical, then the areas described by the new third reference areas and the areas described by the third reference areas are identical.

In a sheet material that has the concave-convex part, an inclination angle $\theta_1$ of the first side surface with respect to the intermediate reference plane and an inclination angle $\theta_2$ of the second side surface with respect to the intermediate reference plane are preferably within the range of 10°-90°.

If the inclination angle $\theta_1$ of the first side surface and the inclination angle $\theta_2$ of the second side surface with respect to the intermediate reference plane are in the range of 10°-90°, then a concave-convex part shape that has a superior stiffness increase factor can be obtained while ensuring formability.

If the inclination angle $\theta_1$ of the first side surface and the inclination angle $\theta_2$ of the second side surface are less than 10°, then the amount by which the first areas and the second areas protrude will decrease, which will decrease the stiffness increase factor. In addition, if the inclination angle $\theta_1$ of the first side surface and the inclination angle $\theta_2$ of the second side surface exceed 90°, then forming the concave-convex part will be problematic, and such an area will not be needed.

Furthermore, in a case wherein a metal sheet is press formed, because of problems with formability, the upper limit value of the inclination angle $\theta_1$ of the first side surface and the upper limit value of the inclination angle $\theta_2$ of the second side surface are more preferably less or equal to 70°. Accordingly, the range is more preferably 10°-70°.

In addition, the first side surface and the second side surface comprise a plurality of surfaces, but it is not necessary for all of those surfaces to have the same inclination angle; for example, the inclination angle may vary with the region. However, every surface is preferably within the abovementioned preferable inclination angle range.

In a sheet material that has the concave-convex part, at least part of the first reference plane, at least part of the intermediate reference plane, and at least part of the second reference plane, these planes being successively disposed, are preferably parallel curved surfaces.

In this case, the sheet material that has the superior concave-convex part whose stiffness is high can be deformed into various shapes, and the range of application can be expanded.

In a sheet material that has the concave-convex part, the concave-convex part is formed preferably by press forming a metal sheet.

The concave-convex part can be easily formed by press forming a metal sheet, such as by embossing, or by plastic working a metal sheet, such as by rolling. Consequently, the superior concave-convex part shape can be adapted to a metal sheet comparatively easily. Various materials that can be plastically worked, such as aluminum alloy, steel, and copper alloy, can be used as the material of the metal sheet.

Furthermore, in addition to plastic working such as rolling, it is also possible to use casting, cutting, and the like as the forming method.

In addition, as long as it has the concave-convex part, the sheet material is also effective with materials other than metal; for example, the sheet material can also be a resin sheet and the like. In the case of a resin material and the like, the concave-convex part can be formed by, for example, injection molding or hot pressing. Compared with metal material, resin material tends not to be constrained in its formation and has a greater number of degrees of freedom in its design.

In addition, in a sheet material that has the concave-convex part, a sheet thickness t of the metal sheet prior to forming is preferably 0.03-6.0 mm.

When the sheet thickness of the metal sheet is less than 0.03 mm or exceeds 6.0 mm, there is little need to increase its stiffness in application.

In the sheet material that has the concave-convex part, the ratio of a spacing S (mm) to the sheet thickness t (mm), namely, a ratio S/t, is preferably 5-2,000, wherein S (mm) is the spacing formed between the first lattice straight lines, between the second lattice straight lines, and between the third lattice straight lines.

If the ratio S/t is less than 5, then there is a risk that forming will become difficult; moreover, if the ratio S/t exceeds 2,000, then there is a risk that problems will arise, such as it being no longer possible to sufficiently form the concave-convex part shape, and that stiffness will decrease.

In a sheet material that has the concave-convex part, a ratio H1/t of a projection height H1 (mm) of the first area to the sheet thickness t (mm), and the maximum inclination angle $\theta_1$ (°) formed between the first side surface and the intermediate reference plane preferably have the relationship $1 \leq (H1/t) \leq -3\theta_1 + 272$; and a ratio H2/t of a projection height H2 (mm) of the second area to the sheet thickness t (mm), and the maximum inclination angle $\theta_2$ (°) formed between the second side surface and the intermediate reference plane preferably have the relationship $1 \leq (H2/t) \leq -3\theta_2 + 272$.

If the ratio H1/t is less than 1, then there is a risk that a problem will arise wherein the stiffness increase effect produced by the formation of the first areas will not be sufficient. Moreover, if the ratio H1/t exceeds $-3\theta_1+272$, then there is a risk that a problem will arise wherein forming will become difficult. Likewise, if the ratio H2/t is less than 1, then there is a risk that a problem will arise wherein the stiffness increase effect produced by the formation of the second areas will not be sufficient. Moreover, if the ratio H2/t exceeds $-3\theta_2+272$, then there is a risk that a problem will arise wherein forming will become difficult.

In addition, in the abovementioned laminated structure, it is possible to configure a laminated body with a three-layer structure wherein the sheet material that has the concave-convex part is used as one core material, and one flat faceplate is provided and disposed on each side thereof. In addition, it is also possible to configure a structure that repeats such a basic structure, namely, a multilayer structure wherein a plurality of the sheet materials, each sheet material having the concave-convex part, is stacked, with a flat faceplate inserted after every sheet material.

In addition, it is also possible to adopt a structure wherein the plurality of sheet materials having the concave-convex parts are directly stacked and used as the core material, and the flat faceplates are joined to a surface on one side thereof or to surfaces on both sides thereof.

In addition, it is also possible to configure a laminated structure in the state wherein only the plurality of the sheet materials having the concave-convex parts are directly stacked.

The number of the sheet materials stacked can be modified in accordance with the application and the required characteristics.

In addition, the abovementioned vehicle panel is not limited to the hood of an automobile and can also be adapted to: a panel, such as a door, a roof, a floor, and a trunk lid; a reinforcing member; and an energy absorbing member, such as a bumper, a crush box, a door beam, and the like. In addition, a steel sheet, an aluminum alloy sheet, or the like can also be used as the outer panel and the inner panel.

If the outer panel comprises an aluminum alloy sheet, then, for example, a 6000 series alloy is ideal because it is relatively low cost. In addition, if the inner panel comprises an aluminum alloy sheet, then, for example, a 5000 series alloy sheet is ideal because it has relatively good formability.

Embodiments

First Embodiment

An embodiment of a sheet material 1 that has a concave-convex part 20 according to a first aspect will now be explained, referencing FIG. 1 through FIG. 3.

FIG. 1 is a partial plan view of the concave-convex part 20. Portions that are contours of new first areas 213 (FIG. 3) and new second areas 223 (FIG. 3) in an intermediate reference plane K3 in the same figure and are not visible as outlines are indicated by broken lines (the same applies to FIG. 2, FIG. 4, FIG. 5, and FIG. 12, which are discussed below).

Figure 3:
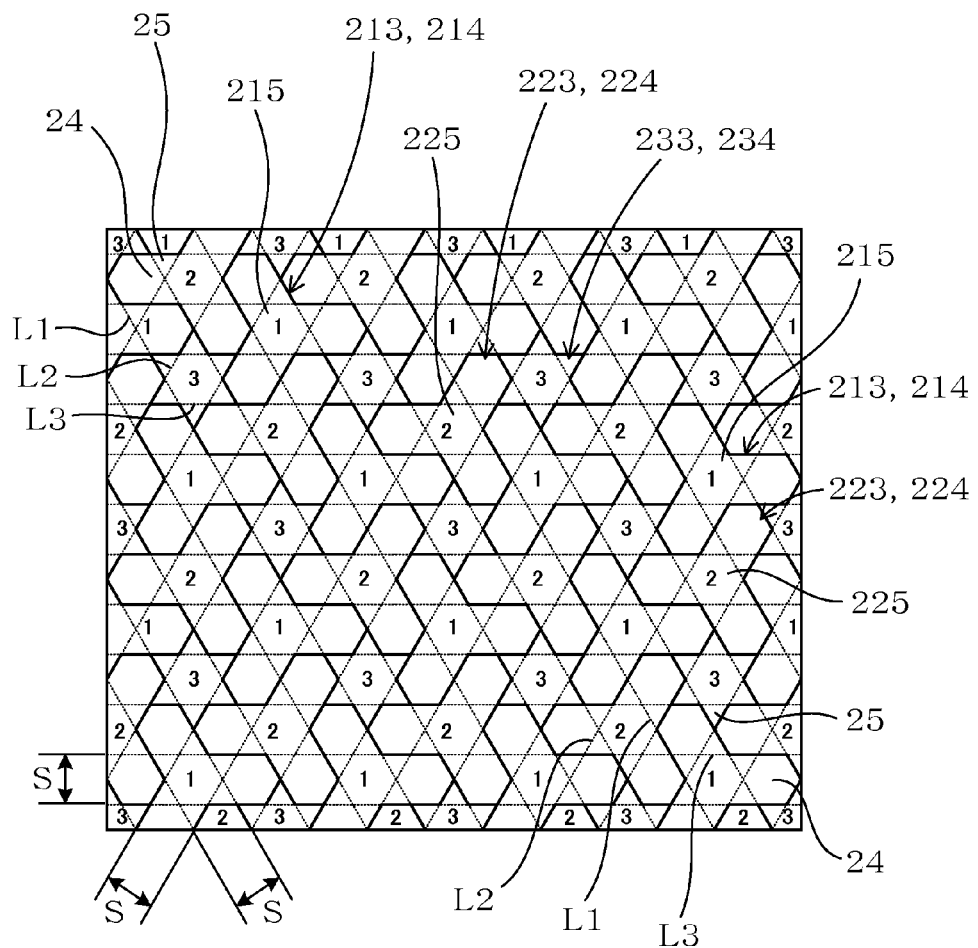
FIG. 3 is an explanatory diagram that shows, according to the first embodiment, an arrangement of new first reference areas, new second reference areas, and new third reference areas in an intermediate reference plane.
Figure 3:
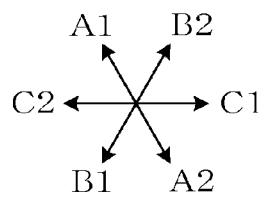

In addition, FIG. 3 shows the shape of the concave-convex part 20 of the sheet material 1 as an arrangement of the new first reference areas 213, the new second reference areas 223, and new third reference areas 233 in the intermediate reference plane K3. In the same figure, the solid lines indicate contour lines of the new first reference areas 213, the new second reference areas 223, and the new third reference areas 233. In addition, the numeral recorded on the inner side of each of the contour lines indicates which of the areas that area corresponds to, with 1 indicating the new first reference areas 213, 2 indicating the new second reference areas 223, and 3 indicating the new third reference areas 233. (This applies likewise to FIG. 6 and FIG. 10, which are discussed below.)

Figure 1B:
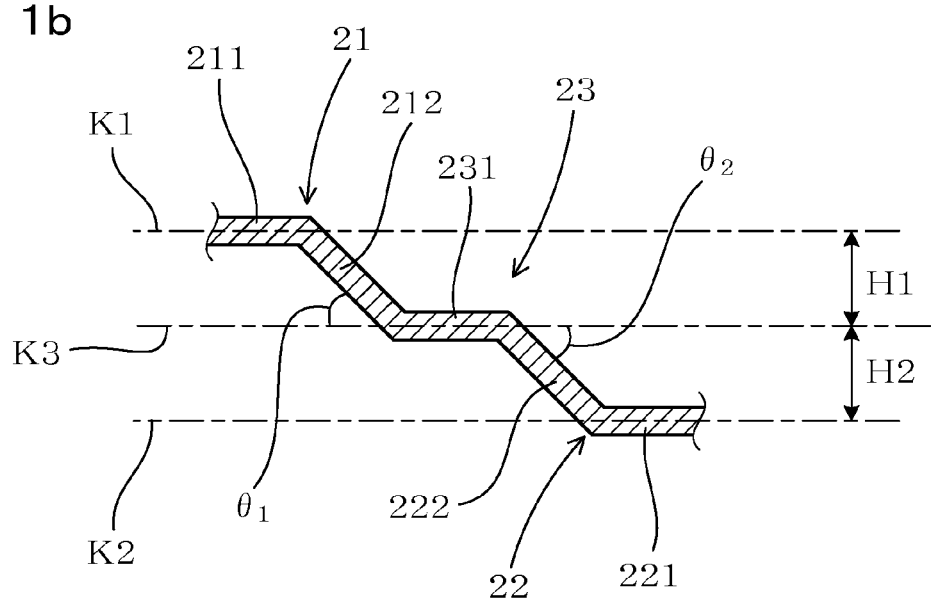
Figure 2:
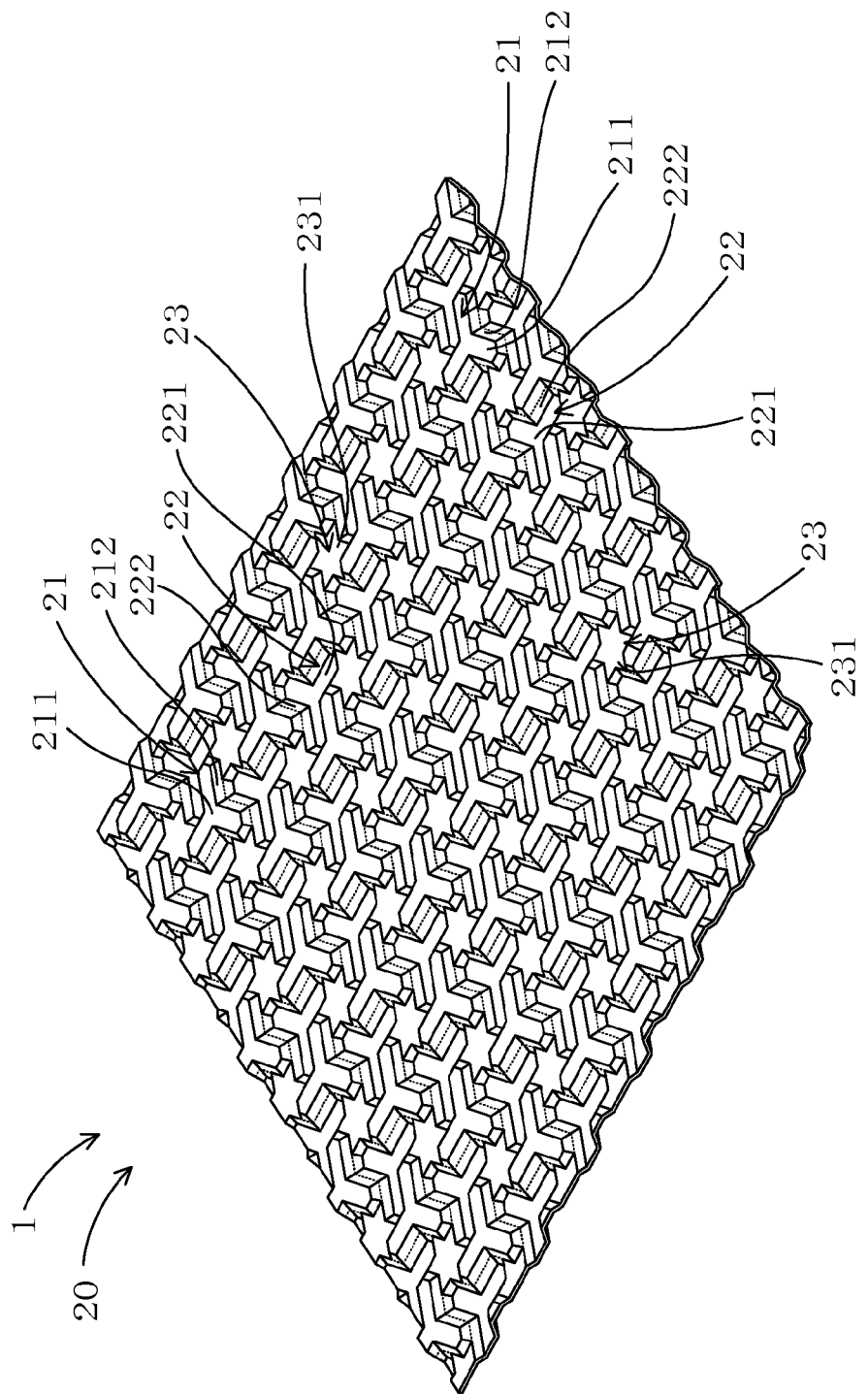
FIG. 2 is a partial oblique view of the concave-convex part according to the first embodiment.

The sheet material 1 that has the concave-convex part 20 of the present embodiment is a sheet material whose stiffness has been increased by the formation of the concave-convex part 20, as shown in FIG. 1 through FIG. 2.

The concave-convex part 20 is configured as follows.

As shown in FIG. 1(b), three reference planes—namely, a first reference plane K1, the intermediate reference plane K3, and a second reference plane K2, which are three virtual planes that are successively disposed spaced apart and parallel to one another—are used as references. As shown in FIG. 3, a plurality of virtual first lattice straight lines L1 are disposed in the intermediate reference plane K3 parallel to one another and spaced apart by the prescribed spacing S (mm), and a plurality of virtual second lattice straight lines L2, which are inclined by substantially 60° with respect to the first lattice straight lines L1, are disposed in the intermediate reference plane K3 parallel to one another and spaced apart by the spacing S (mm). In addition, a plurality of virtual third lattice straight lines L3 are disposed parallel to one another and spaced apart by the spacing S (mm) such that the third lattice straight lines L3 are inclined by substantially 60° with respect to the first lattice straight lines L1 and the second lattice straight lines L2 and such that the third lattice straight lines L3 pass through the midpoint of each side of minimum unit rhombuses partitioned by the first lattice straight lines L1 and the second lattice straight lines L2. The intermediate reference plane K3 is partitioned by the first lattice straight lines L1, the second lattice straight lines L2, and the third lattice straight lines L3, and thereby hexagonal unit areas 24 and triangular unit areas 25 are spread out in the intermediate reference plane K3.

As shown in FIG. 3, in the intermediate reference plane K3, an A1 direction is a direction that leads in one direction and is parallel to the first lattice straight lines L1, an A2 direction is a direction that leads in the reverse direction of the A1 direction, a B1 direction is parallel to the second lattice straight lines and forms an angle of 120° with respect to the A1 direction, and a B2 direction is a direction that leads in the reverse direction of the B1 direction. In addition, a C1 direction is parallel to the third lattice straight lines and forms an angle of 120° with respect to both the A1 direction and the B1 direction, and a C2 direction is a direction that leads in the reverse direction of the C1 direction.

Each first hexagon 215 is an arbitrary hexagonal unit area 24, and the first hexagons 215 are disposed such that each of the first hexagons 215 skips two of the hexagonal unit areas 24 in each of the A1, A2, B1, B2, C1, and C2 directions. Furthermore, first reference areas 214 are dodecagonal areas, each of which comprises four of the hexagonal unit areas 24 and six of the triangular unit areas 25 and is configured by combining one of the first hexagons 215 with two of the adjacent triangular unit areas 25 and one of the adjacent hexagonal unit areas 24 in each of the A1, B1, and C1 directions.

Each second hexagon 225 is the hexagonal unit area 24 that, with respect to the hexagonal unit area 24 adjacent to the first hexagon 215 in the B1 direction, is further adjacent in the A2 direction. The second hexagons 225 are disposed such that each of the second hexagons 225 skips two of the hexagonal unit areas 24 in each of the A1, A2, B1, B2, C1, and C2 directions. Furthermore, second reference areas 224 are dodecagonal areas, each of which comprises four of the hexagonal unit areas 24 and six of the triangular unit areas 25 and is configured by combining one of the second hexagons 225 with two of the adjacent triangular unit areas 25 and one of the adjacent hexagonal unit areas 24 in each of the A2, B2, and C2 directions.

In addition, third reference areas 234 are dodecagonal areas that are interspersed between the first reference areas 214 and the second reference areas 224 and comprise one of the hexagonal unit areas 24 and six of the triangular unit areas 25 disposed therearound. In the present embodiment, each of the new first reference areas 213 is an area that comprises one of the first reference areas 214, as is, and each of the new second reference areas 223 is an area that comprises one of the second reference areas 224, as is. In addition, each of the new third reference areas 233 is one of the third reference areas 234, as is.

As shown in FIG. 1 and FIG. 2, the concave-convex part 20 comprises: first areas 21, which protrude from the new first reference areas 213 defined in the intermediate reference plane K3 toward the first reference plane K1; and second areas 22, which protrude from the new second reference areas 223 defined in the intermediate reference plane K3 toward the second reference plane K2. In addition, the concave-convex part 20 comprises the third areas, which are formed in the intermediate reference plane K3 based on the new third reference areas 233 defined in the intermediate reference plane K3.

Each of the first areas 21 comprises: a first top surface 211, which is a projection of the new first reference area 213 into the first reference plane K1 at reduction magnification; and first side surfaces 212, which connect the contour of the first top surface 211 with the contour of its new first reference area 213. Likewise, each of the second areas 22 comprises: a second top surface 221, which is a projection of the new second reference area 223 into the second reference plane K2 at reduction magnification; and second side surfaces 222, which connect the contour of the second top surface 221 with the contour of its new second reference area 223. In addition, each of the third areas 23 comprises an intermediate surface 231, which is formed in the intermediate reference plane K3 based on the contour of its new third reference area 233.

As shown in FIG. 1(b), the three reference planes, namely, the first reference plane K1, the intermediate reference plane K3, and the second reference plane K2, in the present embodiment are parallel planes.

In addition, the first top surface 211 is configured such that the center of the sheet thickness thereof overlaps the first reference plane K1, and the second top surface 221 is configured such that the center of the sheet thickness thereof overlaps the second reference plane K2. In addition, the intermediate surface 231 is configured such that the center of the sheet thickness overlaps the intermediate reference plane K3. Furthermore, the distance between the first reference plane K1 and the intermediate reference plane K3 is designated as the projection height H1, and the distance between the second reference plane K2 and the intermediate reference plane K3 is designated as the projection height H2.

In the present embodiment, the projection height H1 of each of the first areas 21 and the projection height H2 of each of the second areas 22 are each 1.0 mm.

In addition, the inclination angle $\theta_1$ of the first side surface 212 with respect to the intermediate reference plane K3 and the inclination angle $\theta_2$ of the second side surface 222 with respect to the intermediate reference plane K3 are equal, namely, $\theta_1=\theta_2=45°$; furthermore, the first side surface 212 and the second side surface 222 are each formed as one continuous flat surface without any bent parts.

In addition, in the present embodiment, the sheet material 1 that has the concave-convex part 20 is a 1000 series aluminum sheet whose sheet thickness t=0.3 mm prior to formation of the sheet. The concave-convex part 20 is press formed using a pair of molds. Furthermore, it is also possible to use, as the forming method, some other plastic working method such as roll forming that forms by using a pair of forming rolls, the surfaces of which are profiled with the desired concave-convex shape.

In addition, the spacing S between the first lattice straight lines L1, between the second lattice straight lines L2, and between the third lattice straight lines L3 is 5 mm, and the ratio of the spacing S (mm) to the sheet thickness t (mm), namely, the ratio S/t, is 16.7 and is within the range of 5-2,000.

In addition, the ratio H1/t of the projection height H1 (mm) of each of the first areas 21 to the sheet thickness t (mm) is 3.3. In addition, the inclination angle $\theta_1$ formed by each of the first side surfaces 212 and the intermediate reference plane K3 is 45°, and $-3\theta_1+272=137$. Accordingly, the relationship $1 \leq H1/t \leq 137$ is satisfied. Likewise, the ratio H2/t of the projection height H2 (mm) of each of the second areas 22 to the sheet thickness t (mm) is 3.3. In addition, the inclination angle $\theta_2$ formed by each of the second side surfaces 222 and the intermediate reference plane K3 is 45°, and $-3\theta_2+272=137$. Accordingly, the relationship $1 \leq H2/t \leq 137$ is satisfied.

The sheet material 1 that has the concave-convex part 20 of the present embodiment has the abovementioned specially shaped concave-convex part 20. As mentioned above, the concave-convex part 20 comprises the first areas 21, which protrude from the new first reference areas 213 defined in the intermediate reference plane K3 toward the first reference plane K1, the second areas 22, which protrude from the new second reference areas 223 defined in the intermediate reference plane K3 toward the second reference plane K2, and the third areas 23, which are formed in the intermediate reference plane K3 based on the new third reference areas 233 defined in the intermediate reference plane K3.

Furthermore, each of the first areas 21 comprises the first top surface 211 and the first side surfaces 212, which connect the contour of the first top surface 211 with the contour of its new first reference area 213; in addition, each of the second areas 22 comprises the second top surface 221 and the second side surfaces 222, which connect the contour of the second top surface 221 with the contour of its new second reference area 223. In addition, each of the third areas 23 comprises one of the intermediate surfaces 231, which is formed based on the contour of its new third reference area 233.

Because it has such a structure, the sheet material has superior bending stiffness and surface stiffness as well as superior energy absorption characteristics. In addition, attendant with the increase in the stiffness, it is also possible to obtain the effect of improving damping characteristics; in addition, the irregular shape makes it possible to obtain the effect of suppressing sound reverberations.

In addition, the concave-convex part is shaped such that it has a stiffness increase effect in every direction of the surface of the sheet material. Consequently, it is possible to obtain a high stiffness increase effect with extremely low anisotropy.

(FEM Analysis)

To quantitatively determine the stiffness increase effect of the sheet material 1 of the present embodiment, a bending stiffness evaluation of a cantilevered beam was performed using FEM analysis.

The FEM analysis was conducted using two patterns: one in the 0° direction and one in the 90° direction with respect to the formation direction of the concave-convex part 20.

<Bending Stiffness Evaluation of a Cantilevered Beam>

The test piece used in the FEM analysis of a cantilevered beam has a rectangular shape measuring 120 mm×120 mm, and the concave-convex part 20 is formed over the entire surface thereof. Furthermore, taking the percentage of increase in the surface area into consideration, the sheet thickness t after the formation of the sheet is 0.260 mm.

The evaluation was performed by comparing the amount of deflection obtained by conducting the same FEM analysis on the flat sheet shaped original sheet whereon the concave-convex part 20 is not formed.

<0° Direction>

As shown in FIG. 1, the direction wherein, in the directions orthogonal to the third lattice straight lines L3 of the test piece, one end part Z1 is a fixed end and an other end part Z2, which opposes the Z1, is a free end is designated the 0° direction.

The sheet material 1 that has the concave-convex part 20 of the first embodiment was compared with the flat sheet shaped original sheet, and it was found that the bending stiffness increased by 5.3 times.

<90° Direction>

As shown in FIG. 1, the direction wherein, positioned in the directions described by the third lattice straight lines L3 of the test piece, one end part Z3 is a fixed end and an other end part Z4, which opposes the Z3, is a free end is designated the 90° direction.

The sheet material 1 that has the concave-convex part 20 of the first embodiment was compared with the flat sheet shaped original sheet, and it was found that the bending stiffness increased by 5.2 times.

Based on the result of the FEM analysis, with respect to the sheet material 1 that has the concave-convex part 20 described in the present embodiment, in the 0° direction, the stiffness multiplier G is expected to be 5.3 times that of a flat sheet, and the weight reduction factor W (%) is expected to be approximately 42% of a flat sheet. In addition, in the 90° direction, too, the stiffness multiplier G is expected to be 5.2 times that of a flat sheet, and the weight reduction factor W (%) to be approximately 42% of a flat sheet, which is the same as in the 0° direction.

Furthermore, the weight reduction factor W (%) is derived using the stiffness multiplier G based on the formula $W=(1-1/\sqrt[3]{\sqrt{G}})\times 100$.

Second Embodiment

The present embodiment describes one example of the sheet material 1 that has the concave-convex part 20 according to a second aspect. In this example, after partitioning into the first reference areas 214, the second reference areas 224, and the third reference areas 234 in the same way as the first embodiment as shown in FIG. 3, all of the third reference areas 234 are distributed to the adjacent first reference areas 214 and the adjacent second reference areas 224 as shown in FIG. 6 such that the surface areas of the new first reference areas 213 and the new second reference areas 223 are substantially equal.

Figure 4A:
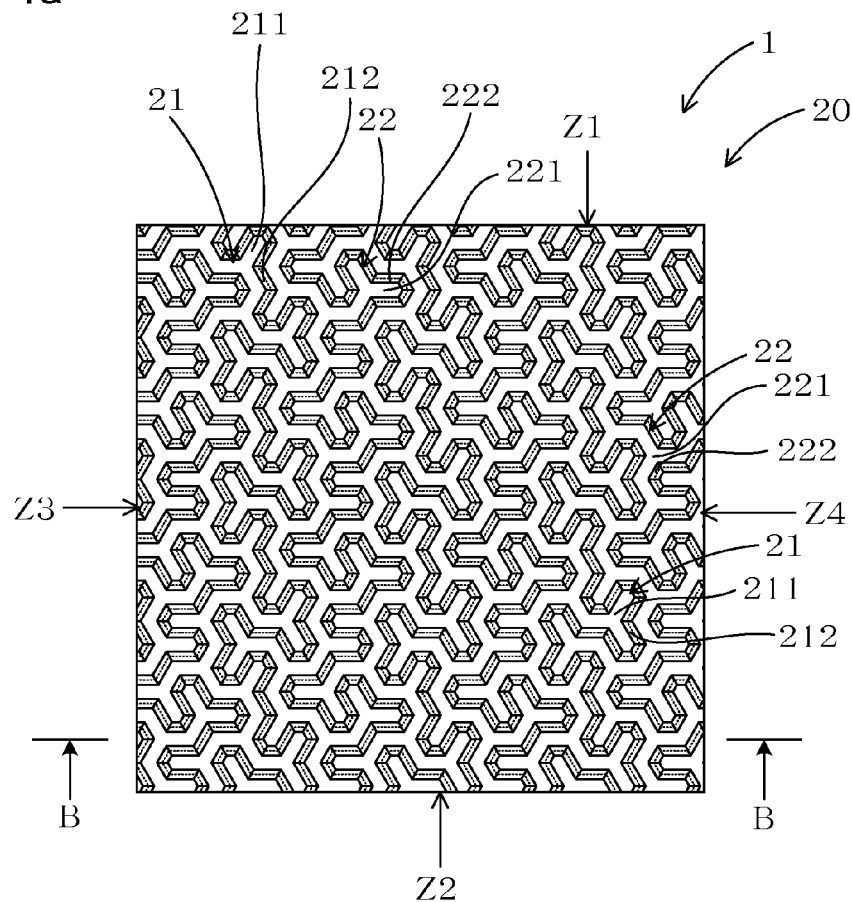
FIG. 4 shows a second embodiment, wherein (a) is a partial plan view of the concave-convex part, and (b) is a partial enlarged view of a cross sectional view taken along the B-B line in (a).
Figure 4B:
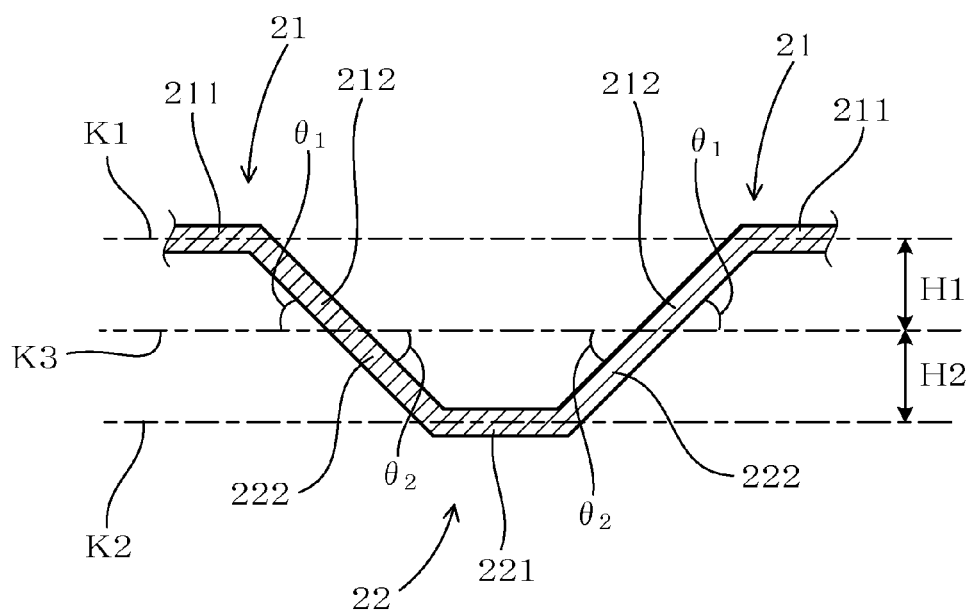
Figure 5:
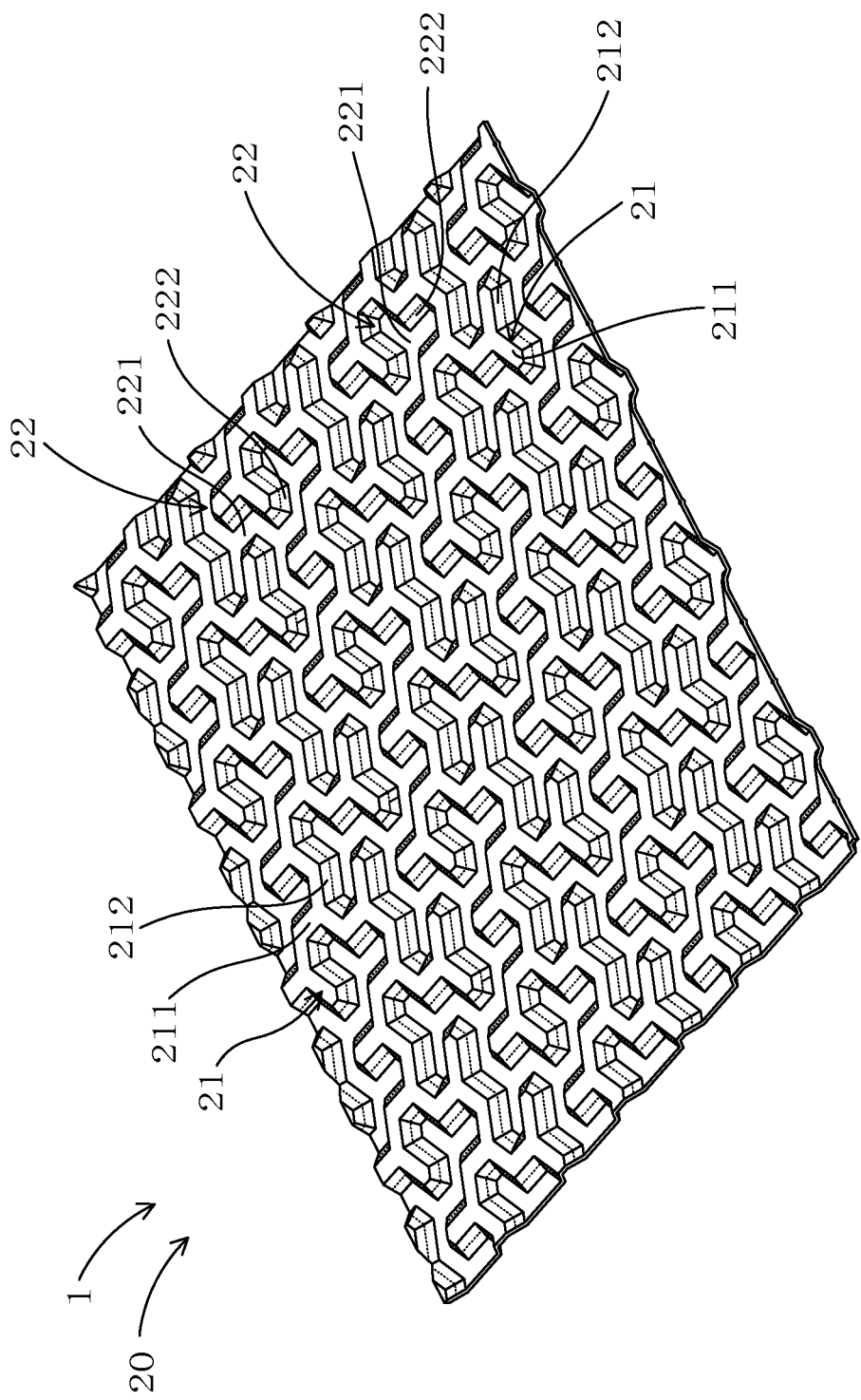
FIG. 5 is a partial oblique view of the concave-convex part according to the second embodiment.
Figure 6:
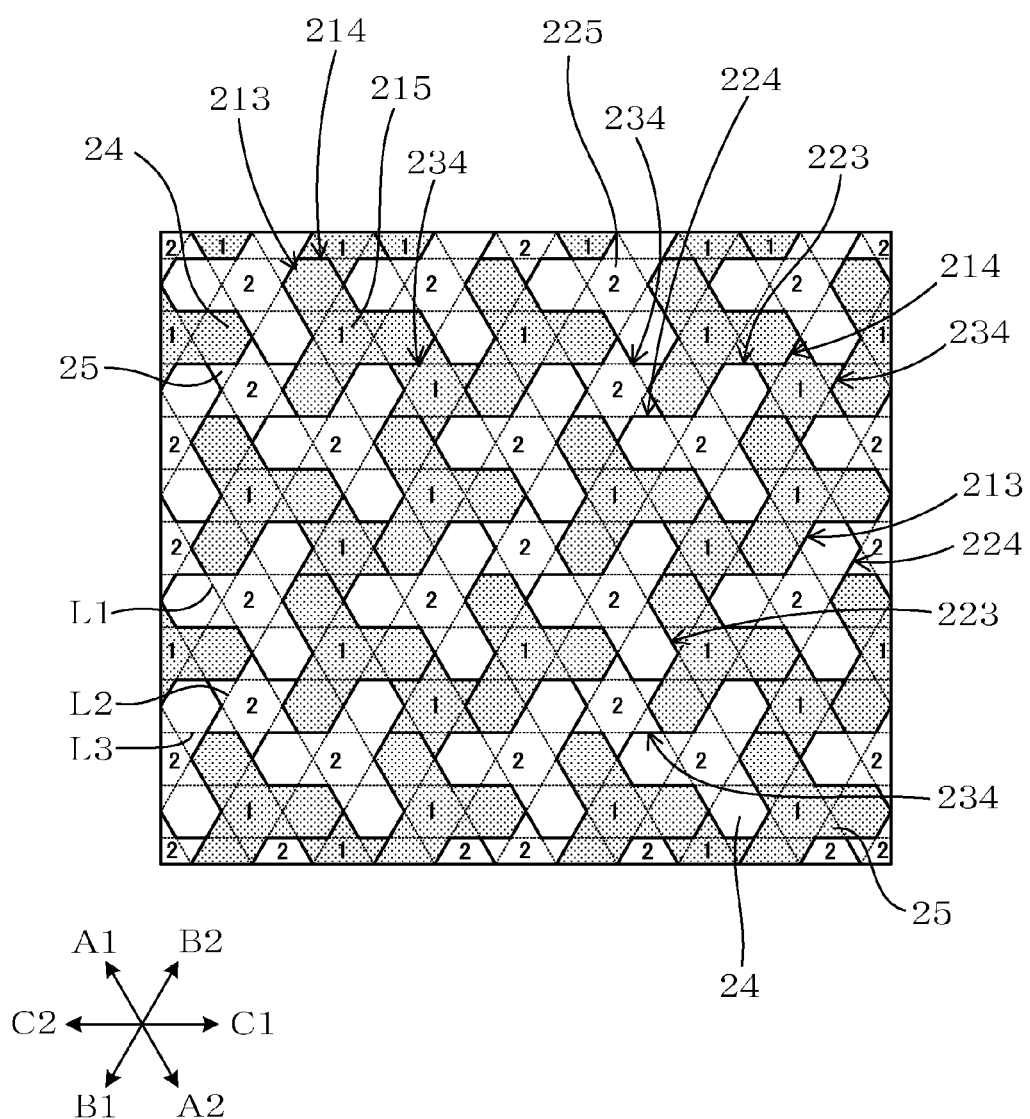
FIG. 6 is an explanatory diagram that shows, according to the second embodiment, an arrangement of new first reference areas and new second reference areas in the intermediate reference plane.

As shown in FIG. 4 through FIG. 6, the concave-convex part 20 of the present embodiment comprises: the first areas 21, which protrude from the new first reference areas 213 defined in the intermediate reference plane K3 toward the first reference plane K1; and the second areas 22, which protrude from the new second reference areas 223 defined in the intermediate reference plane K3 toward the second reference plane K2.

Each of the first areas 21 comprises: one of the first top surfaces 211, which is a projection of its new first reference area 213 into the first reference plane K1 at reduction magnification; and the first side surfaces 212, which connect the contour of the first top surface 211 with the contour of its new first reference area 213. Likewise, each of the second areas 22 comprises: one of the second top surfaces 221, which is a projection of its new second reference area 223 into the second reference plane K2 at reduction magnification; and the second side surfaces 222, which connect the contour of the second top surface 221 with the contour of its new second reference area 223. Other aspects of the configuration are the same as those in the first embodiment.

As shown in FIG. 6, in the intermediate reference plane K3 of the present embodiment, half of the third reference areas 234 are distributed in the adjacent first reference areas 214, and half of the third reference areas 234 are distributed in the second reference areas 224. Furthermore, the areas that combine the first reference areas 214 and the third reference areas 234 are designated the new first reference areas 213, and the areas that combine the second reference areas 224 and the third reference areas 234 are designated the new second reference areas 223. Furthermore, in the present embodiment, the third reference areas 234 are distributed such that the surface area of the new first reference areas 213 and the surface area of the new second reference areas 223 are substantially equal.

When the third reference areas 234 are distributed in the first reference areas 214 and the second reference areas 224, it is preferable to distribute the third reference areas one half at a time such that the surface areas of the new first reference areas 213 and new second reference areas 223 formed thereby are substantially equal. The distributing method is to distribute the successively disposed third reference areas 234 in any two directions from among the A1-A2 directions parallel to the first lattice straight lines L1, the B1-B2 directions parallel to the second lattice straight lines, and the C1-C2 directions parallel to the third lattice straight lines L3 such that the same number of the first reference areas 214 and the second reference areas 224 are alternately distributed. In addition, the aforementioned number may differ in the aforementioned two directions, and is preferably three or fewer in any direction. The shape of the concave-convex part 20 formed when distributing in this manner is a superior concave-convex part shape that has particularly high stiffness and low stiffness anisotropy.

For example, in the present embodiment, as shown in FIG. 6, the third reference areas 234 are distributed in the A1-A2 directions two at a time alternately in the first reference areas 214 and the second reference areas 224. In addition, by distributing in the C1-C2 directions one at a time alternately in the first reference areas 214 and the second reference areas 224, half of the third reference areas 234 are distributed in the first reference areas 214 and half of the third reference areas 234 are distributed in the second reference areas 224.

Furthermore, as shown in FIG. 4 and FIG. 5, the concave-convex part 20 of the present embodiment comprises: the first areas 21, which protrude from the new first reference areas 213 toward the first reference plane K1, and the second areas 22, which protrude from the new second reference areas 223 toward the second reference plane K2.

Each of the first areas 21 comprises the first top surface 211 and the first side surfaces 212, which connect the contour of the first top surface 211 with the contour of its new first reference area 213; in addition, each of the second areas 22 comprises the second top surface 221 and the second side surfaces 222, which connect the contour of the second top surface 221 with the contour of its new second reference area 223.

Consequently, the sheet material 1 that has the concave-convex part 20 according to the present embodiment does not have the intermediate surface; furthermore, a greater amount of the material can be effectively used as a strength member, thereby enhancing the stiffness increase effect. In addition, attendant with the increase in the stiffness, it is also possible to obtain the effect of improving damping characteristics; in addition, the irregular shape makes it possible to obtain the effect of suppressing sound reverberations.

In addition, the concave-convex part 20 is shaped such that it has the stiffness increase effect in every direction of the surface of the sheet material. Consequently, a high stiffness increase effect can be obtained in every direction.

(FEM Analysis)

In the present embodiment, too, to quantitatively determine the stiffness increase effect of the sheet material 1 that has the concave-convex part 20, a bending stiffness evaluation of a cantilevered beam was performed using FEM analysis as in the first embodiment.

<Bending Stiffness Evaluation of a Cantilevered Beam>

The test piece used in the FEM analysis of a cantilevered beam has a rectangular shape measuring 120 mm×120 mm, and the concave-convex part 20 is formed over the entire surface thereof. Furthermore, taking the percentage of increase in the surface area into consideration, the sheet thickness t after the formation of the sheet is 0.257 mm.

The evaluation was performed by comparing the amount of deflection obtained by conducting the same FEM analysis on the flat sheet shaped original sheet whereon the concave-convex part 20 is not formed.

<0° Direction>

As shown in FIG. 4, the direction wherein, in the directions orthogonal to the third lattice straight lines L3 of the test piece, the one end part Z1 is a fixed end and the other end part Z2, which opposes the Z1, is a free end is designated the 0° direction.

The sheet material 1 that has the concave-convex part 20 of the second embodiment was compared with the flat sheet shaped original sheet, and it was found that the bending stiffness increased by 9.2 times.

<90° Direction>

As shown in FIG. 4, the direction wherein, positioned in the directions described by the third lattice straight lines L3 of the test piece, the one end part Z3 is a fixed end and the other end part Z4, which opposes the Z3, is a free end is designated the 90° direction.

The sheet material 1 that has the concave-convex part 20 of the second embodiment was compared with the flat sheet shaped original sheet, and it was found that the bending stiffness increased by 6.7 times.

In addition, using the same method of FEM analysis of a cantilevered beam discussed above, a bending stiffness evaluation was performed for the cases wherein one side of the test piece and the formation direction of the convex-concave part 20 were changed to directions corresponding to 0°, 15°, 30°, 45°, 60°, 75°, and 90°.

Furthermore, regarding the concave-convex part 20 formed in the test piece used in the FEM analysis for the case wherein the formation direction of the concave-convex 20 was varied, the inclination angle $\theta_1$ (°) of each of the first side surfaces 212 with respect to the intermediate reference plane K3 and the inclination angle $\theta_2$ (°) of each of the second side surfaces 222 with respect to the intermediate reference plane K3 are both 30°; furthermore, each of the first side surfaces 212 and each of the second side surfaces 222 are formed as one continuous flat surface without any bent parts. In addition, taking the percentage of increase of the surface area into consideration, the post-formation sheet thickness t is 0.271 mm. Other aspects of the configuration are the same as those in the first embodiment.

Figure 7:
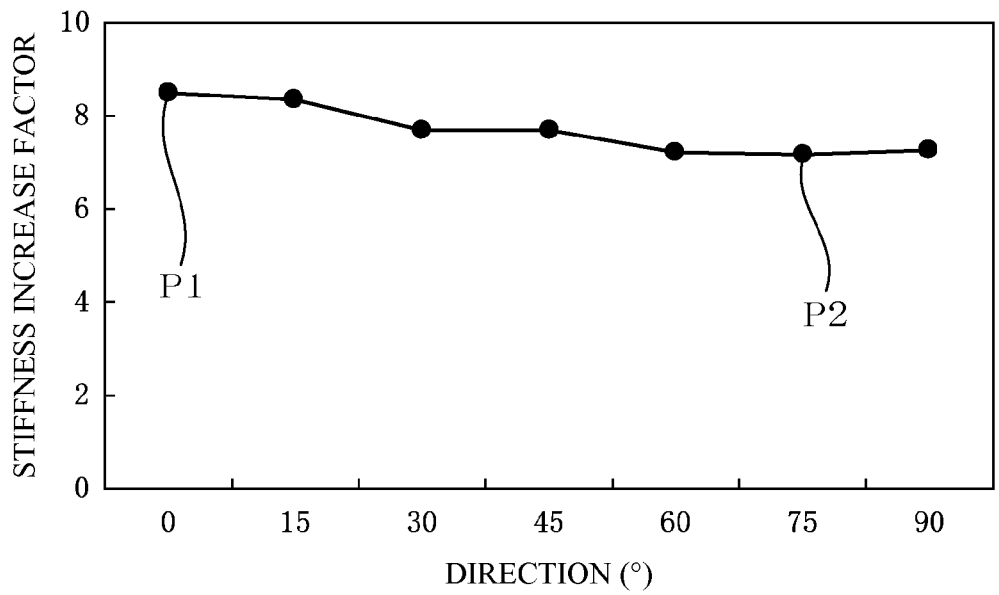
FIG. 7 is an explanatory diagram that shows, according to the second embodiment, the results of an FEM analysis of a cantilevered beam for the case wherein the direction in which the concave-convex part is formed in a test piece is varied.

The results of the FEM analyses are shown in the graph (FIG. 7) wherein the abscissa represents the angle and the ordinate represents the bending stiffness increase factor. As a result, it can be clearly seen that the stiffness increase factor (P1) in the 0° direction is 8.5, which is the maximum value, and the stiffness increase factor (P2) in the 75° direction is 7.2, which is the minimum value. In addition, as shown in FIG. 7, the stiffness increase factor varies extremely little with the shape of the concave-convex part 20 formed in the test piece. Accordingly, it is clear that the stiffness anisotropy of the concave-convex part shape is extremely small.

In addition, with respect to the sheet material 1 that has the concave-convex part 20 described in the present embodiment, in the 0° direction, which is the direction in which the bending stiffness increase effect is the highest, the stiffness multiplier G is expected to be 8.5 times that of a flat sheet, and the weight reduction factor W (%) is expected to be approximately 51% of a flat sheet.

In addition, with respect to the sheet material 1 that has the concave-convex part 20 described in the present embodiment, in the 75° direction, which is the direction in which the bending stiffness increase effect is the lowest, the stiffness multiplier G is expected to be 7.2 times that of a flat sheet, and the weight reduction factor W (%) is expected to be at least approximately 48% of a flat sheet.

Furthermore, the weight reduction factor W (%) was derived using the stiffness multiplier G based on the formula $W=(1-1/\sqrt[3]{\sqrt{G}})\times 100$.

(Three Point Bending Test)

Figure 8:
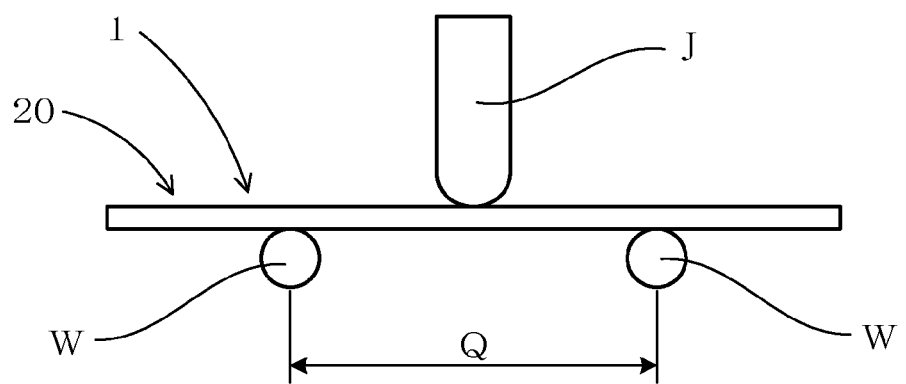
FIG. 8 is an explanatory diagram that shows a three point bending test method according to the second embodiment.

In the three point bending test, as shown in FIG. 8, the test piece was disposed on two fulcrums W, which comprise two cylindrical support members laid on their sides and disposed parallel to one another with a fulcrum-to-fulcrum distance Q=80 mm, a load was applied by a flat sheet shaped pressing jig J, whose tip cross section forms a semicircular shape, and the displacement was measured at the center position of the test piece surface. The evaluation was conducted by performing the same three point bending test on the flat sheet shaped original sheet whereon the concave-convex part 20 is not formed, and then comparing line graphs of load versus displacement.

The test piece is an A3004-O material with a shape prior to forming that measures 100 mm×100 mm and a sheet thickness t=0.3 mm, and the concave-convex part 20 described in the present embodiment is formed over the entire surface. In addition, the forming directions thereof are the same as in the FEM analyses of the cantilevered beam in the 0° direction and the 90° direction.

Figure 9:
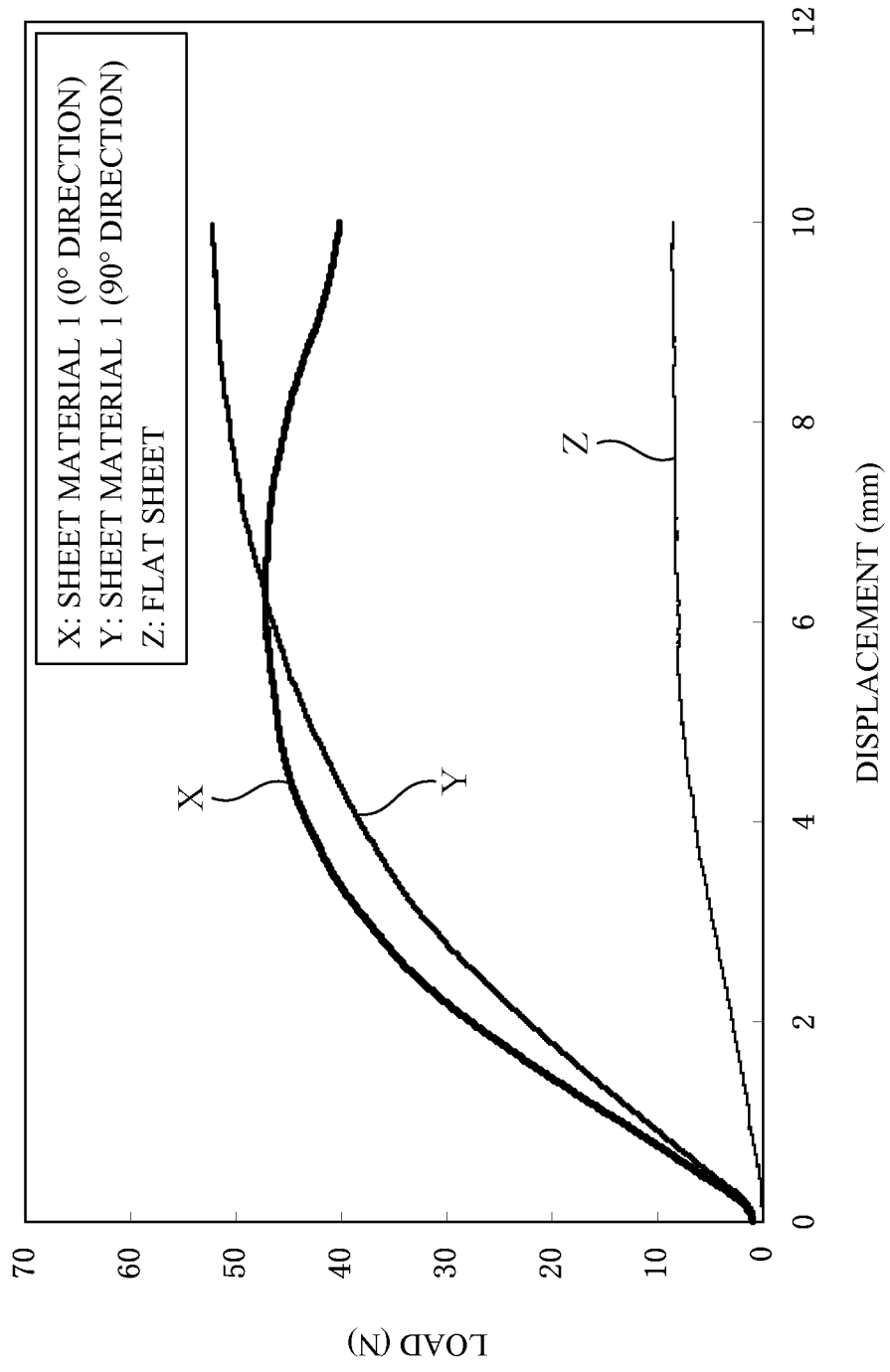
FIG. 9 is a load versus displacement line graph of a three point bending test according to the second embodiment.

FIG. 9 shows a load versus displacement line graph, wherein the ordinate represents the load obtained from the result of the three point bending test, and the abscissa represents the displacement. In the same figure, the measurement results of the sheet material 1 provided with the concave-convex part 20 in the 0° direction are indicated by a solid line X, the measurement results of the sheet material 1 provided with the concave-convex part 20 in the 90° direction are indicated by a solid line Y, and the measurement results of the flat sheet shaped original sheet are indicated by a solid line Z.

As shown in FIG. 9, the rising slope angle of the solid line X is 9.0 times that of the solid line Z. Accordingly, it can be clearly seen that the bending stiffness of the sheet material 1 provided with the concave-convex part 20 in the 0° direction increased by 9.0 times over that of the flat sheet shaped original sheet. In addition, the rising slope angle of the solid line Y was 7.3 times that of the solid line Z. Accordingly, it can be clearly seen that the bending stiffness of the sheet material 1 provided with the concave-convex part 20 in the 90° direction increased by 7.3 times over that of the flat sheet shaped original sheet.

Third Embodiment

Figure 10:
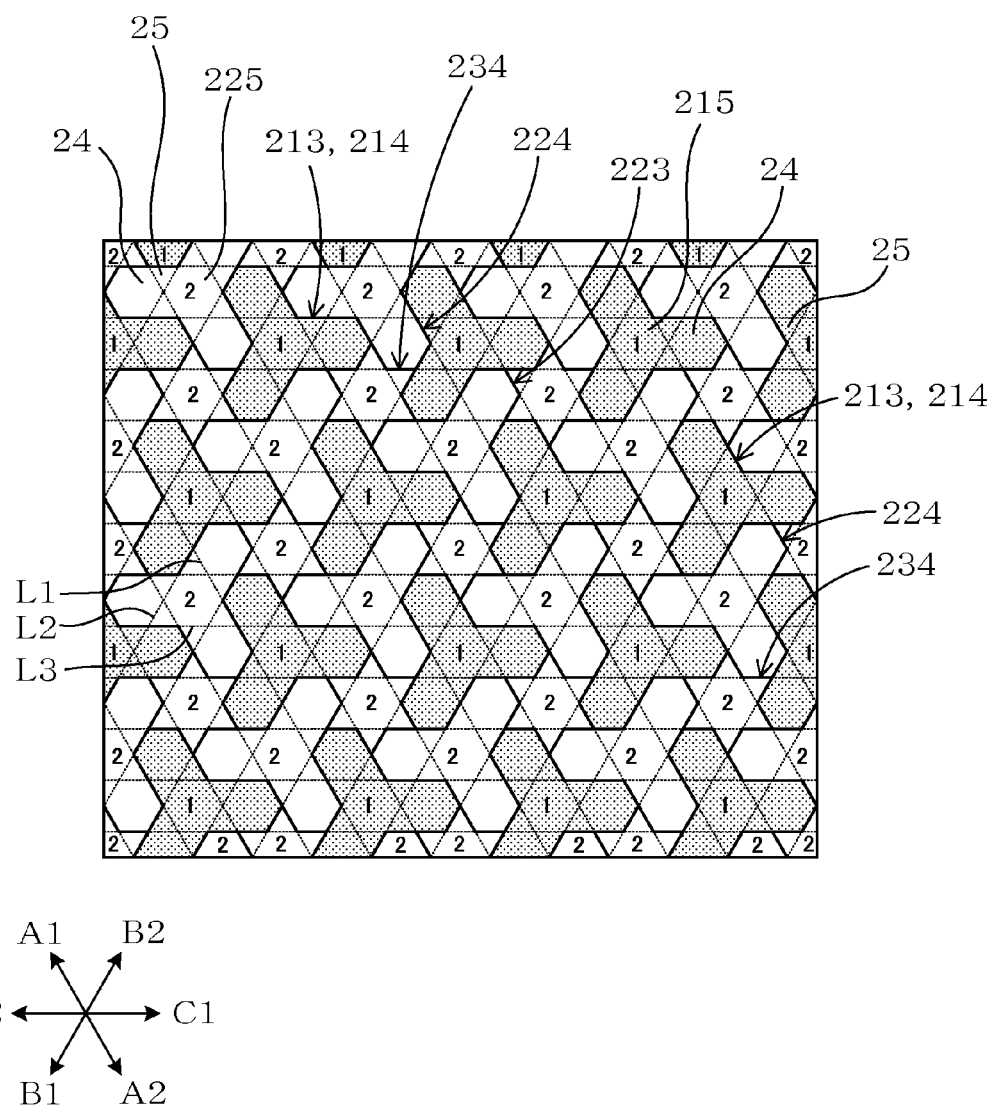
FIG. 10 is an explanatory diagram that shows, according to a third embodiment, an arrangement of new first reference areas and new second reference areas in the intermediate reference plane.

The present embodiment describes another example of the sheet material 1 that has a concave-convex part 20 according to a third aspect. In this example, after the intermediate reference plane K3 is partitioned into the first reference areas 214, the second reference areas 224, and the third reference areas 234 in the same way as the first embodiment as shown in FIG. 3, all of the third reference areas 234 are distributed to the adjacent second reference areas 224 as shown in FIG. 10. Other aspects of the configuration are the same as those in the first embodiment.

To quantitatively determine the stiffness increase effect of the sheet material 1 that has the concave-convex part 20 based on the intermediate reference plane K3 shown in FIG. 10, a bending stiffness evaluation of a cantilevered beam was performed using FEM analysis.

<Bending Stiffness Evaluation of a Cantilevered Beam>

The test piece used in the FEM analysis of a cantilevered beam has a rectangular shape measuring 120 mm×120 mm, and the concave-convex part 20 is formed over the entire surface thereof. Furthermore, taking the percentage of increase in the surface area into consideration, the sheet thickness t after the formation of the sheet is 0.257 mm.

The evaluation was performed by comparing the amount of deflection obtained by conducting the same FEM analysis on the flat sheet shaped original sheet whereon the concave-convex part 20 is not formed.

<0° Direction>

In the test piece wherein the concave-convex part is formed based on the intermediate reference plane K3 shown in FIG. 10, the direction wherein, positioned in the directions orthogonal to the third lattice straight lines L3, the one end part is a fixed end and the other end part is a free end is designated the 0° direction.

The sheet material 1 that has the concave-convex part 20 of the present embodiment was compared with the flat sheet shaped original sheet, and it was found that the bending stiffness increased by 5.9 times.

<90° Direction>

In the test piece wherein the concave-convex part is formed based on the intermediate reference plane K3 shown in FIG. 10, the direction wherein, in the directions described by the third lattice straight lines L3, the one end part is a fixed end and the other end part is a free end is designated the 90° direction.

The sheet material 1 that has the concave-convex part 20 of the present embodiment was compared with the flat sheet shaped original sheet, and it was found that the bending stiffness increased by 5.8 times.

Based on the result of the FEM analysis, with respect to the sheet material 1 that has the concave-convex part 20 described in the present embodiment, in the 0° direction, the stiffness multiplier G is expected to be 5.9 times that of a flat sheet, and the weight reduction factor W (%) is expected to be approximately 45% of a flat sheet. In addition, in the 90° direction, too, the stiffness multiplier G is expected to be 5.8 times that of a flat sheet, and the weight reduction factor W (%) is expected to be at least approximately 44% of a flat sheet.

Furthermore, the weight reduction factor W (%) is derived using the stiffness multiplier G based on the formula $W=(1-1/\sqrt[3]{\sqrt{G}})\times 100$.

Fourth Embodiment

Figure 11:
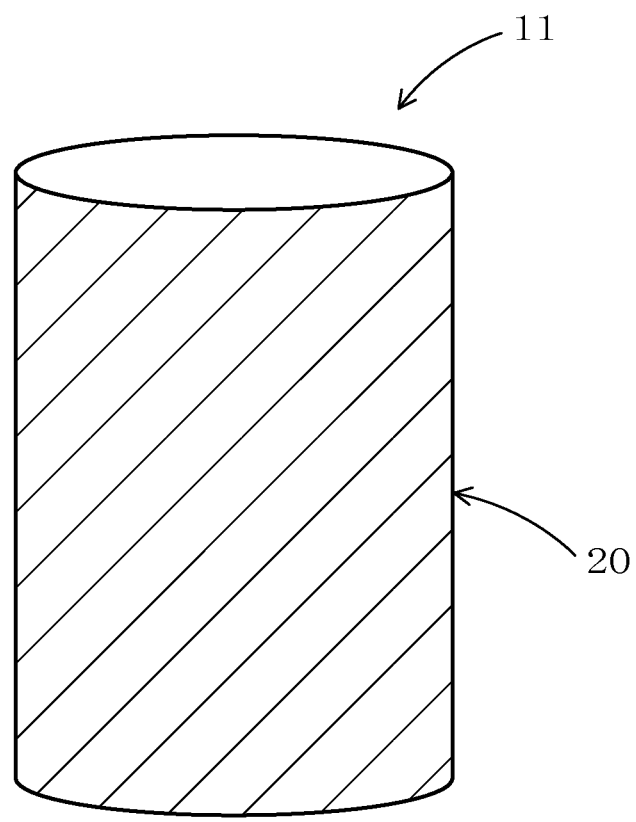
FIG. 11 is an explanatory diagram that shows, according to a fourth embodiment, a cylindrical member that comprises the concave-convex part.

The present embodiment, as shown in FIG. 11, is an example wherein the concave-convex part 20 is provided to a cylindrical member 11. In the present embodiment, the first reference plane K1, the intermediate reference plane K3, and the second reference plane K2 are cylindrical curved planes that are successively disposed parallel to one another. The intermediate reference plane K3 in the present embodiment is the planar intermediate reference plane K3 of any of the first through third embodiments that has been bent into a cylindrical shape. In addition, the configuration of the concave-convex part 20 is the same as that of the first embodiment.

As described in the present embodiment, the sheet material 1 that has the superior concave-convex part 20, whose stiffness is high, can be deformed into a variety of shapes, thereby expanding its range of application. In addition, the same functions and effects as in the first embodiment are obtained.

In addition, by using a cylindrical structure like a beverage can or a rocket, it is possible to increase the stiffness of the cylindrical member 11 that has the concave-convex part 20 described in the present embodiment without increasing the sheet thickness of the material.

In addition, the cylindrical member 11 of the present embodiment has superior energy absorption characteristics.

Consequently, using such in a member of an automobile and the like imparts high stiffness and superior energy absorption characteristics.

Fifth Embodiment

Figure 12:
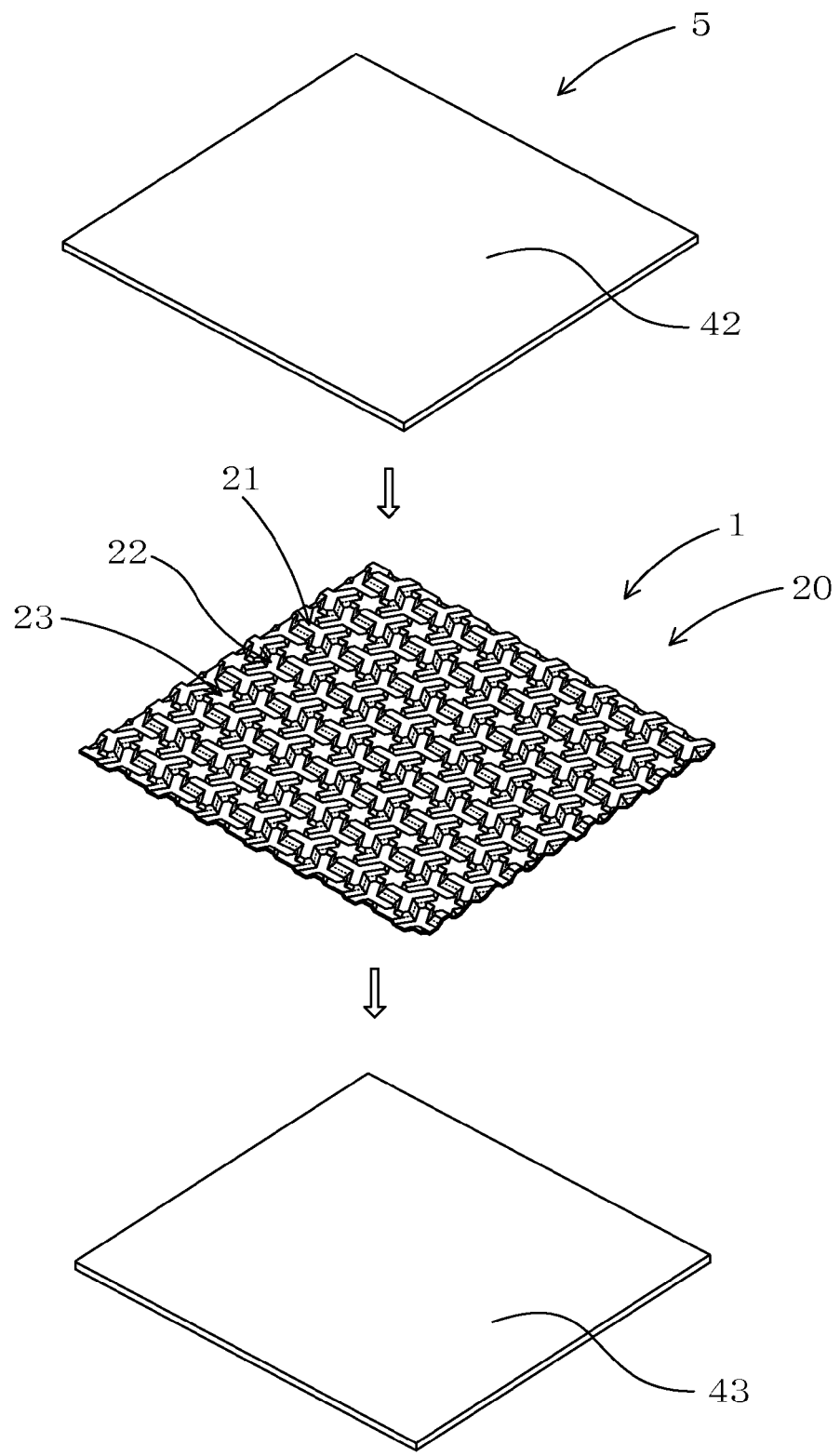
FIG. 12 is an explanatory development view of a laminated structure according to a fifth embodiment.

The present embodiment, as shown in FIG. 12, is an example wherein a laminated structure 5 is configured using as the core material the sheet material 1 that has the concave-convex part 20 of the first embodiment.

Namely, the laminated structure 5 joins faceplates 42, 43 to the surfaces on both sides of the core material, which consists of one sheet material 1 that has the concave-convex part 20.

The faceplates 42, 43 are aluminum alloy sheets that are made of 3000 series material and whose sheet thickness is 1.0 mm.

In the laminated structure 5 of the present embodiment, the sheet material 1 that has the concave-convex part 20, which has superior stiffness as discussed above, is used as the core material, and the faceplates 42, 43 are joined, by bonding, brazing, and the like, to the first top surfaces 211 of the first areas 21 and the second top surfaces 221 of the second areas 22; thereby, the laminated structure 5 obtains a remarkably higher stiffness than that of the sheet material that has the concave-convex part 20 as a standalone.

Moreover, because the sheet material 1 and the faceplates 42, 43 are aluminum alloy sheets, the weight is also reduced. In addition, a damping characteristics improvement effect is obtained attendant with the stiffness increase, and a sound absorption improvement effect is also obtained by the incorporation of air layers. In addition, as is well known, the sound absorbing characteristics can be further improved via the formation of a through hole in either of the faceplates 42, 43 so as to form a Helmholtz sound-absorbing structure.

In addition, if the sheet material 1 that has the concave-convex part 20 of the first embodiment has the intermediate surfaces 231 and is a constituent member of the laminated structure 5, then air gaps are formed into which air can flow between the faceplates 42, 43. Consequently, the formation of the concave-convex part 20 expands the surface area and forms the abovementioned air gaps, thereby providing the laminated structure 5 with superior heat dissipation performance.

Furthermore, it is also possible to use, as the faceplates, a sheet made of resin or a metal other than an aluminum alloy, for example, a steel sheet or a titanium sheet.

Sixth Embodiment

Figure 13:
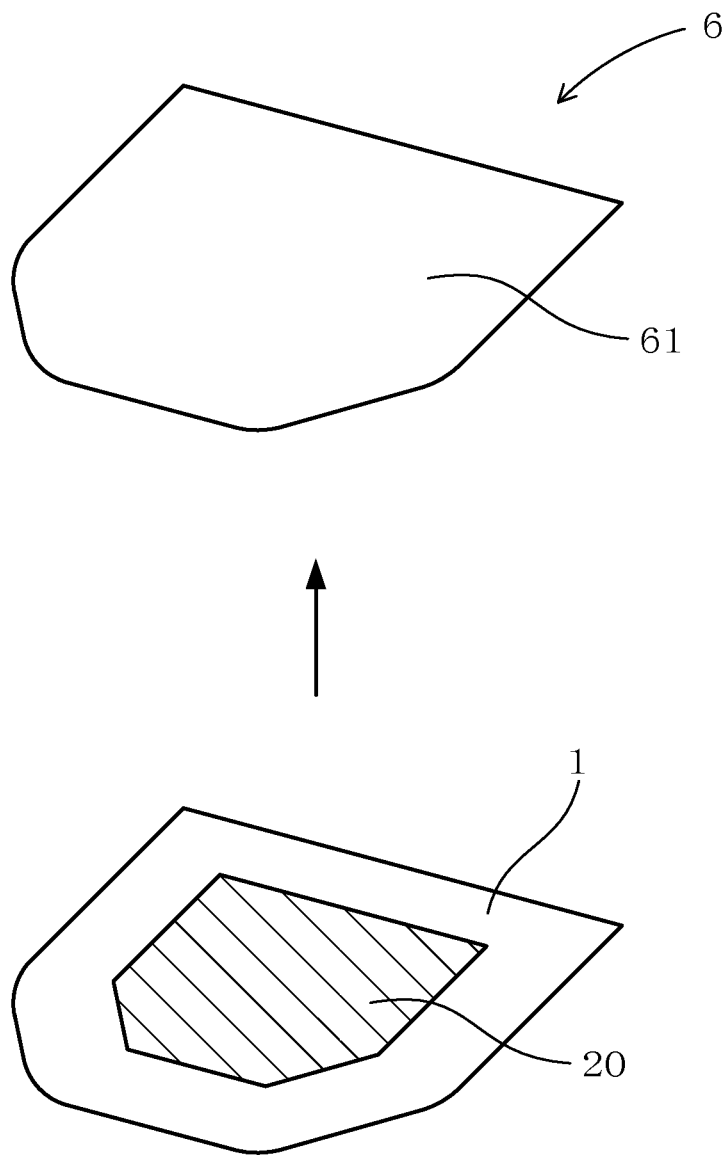
FIG. 13 is an explanatory development view of a vehicle panel according to a sixth embodiment.

The present embodiment, as shown in FIG. 13, is an example of a vehicle panel 6 that is configured by using as the inner panel the sheet material 1 according to any one of the first through third embodiments, and disposing the first top surfaces 211 of the first areas 21 toward the rear surface side of an outer panel 61. Furthermore, the outer panel 61 is joined, by hemming and the like, to an outer circumferential part of the inner panel.

In the vehicle panel 6 of the present embodiment, the sheet material 1 that has the concave-convex part 20 and that constitutes the inner panel obtains an excellent stiffness increase effect, as mentioned above, and therefore has the excellent characteristic of absorbing the energy of a primary impact as well as the energy of a secondary impact in the event the vehicle collides with a pedestrian. In addition, a damping characteristics improvement effect is obtained attendant with the stiffness increase, and a sound absorption improvement effect is also obtained by the incorporation of air layers.

Furthermore, in the present embodiment, the sheet material 1 that has the concave-convex part 20 is used as the inner panel, but the sheet material 1 can also be used as the inner panel or the outer panel, or both.

The invention claimed is:

1. A sheet material having a stiffness-increasing concave-convex part, wherein a first reference plane, an intermediate reference plane, and a second reference plane, which are three virtual planes that are successively disposed spaced apart and parallel to one another, serve as a reference system;

the intermediate reference plane is partitioned by (i) a plurality of virtual first lattice straight lines disposed parallel to one another and spaced apart by a prescribed spacing, (ii) a plurality of virtual second lattice straight lines inclined by substantially 60° with respect to the first lattice straight lines and disposed parallel to one another and spaced apart by the prescribed spacing, and (iii) a plurality of virtual third lattice straight lines inclined by substantially 60° with respect to the first lattice straight lines and the second lattice straight lines, disposed parallel to one another and spaced apart by the prescribed spacing, and disposed such that the third lattice straight lines pass through the midpoint of each side of minimum unit rhombuses partitioned by the first lattice straight lines and the second lattice straight lines, such that a plurality of hexagonal unit areas and a plurality of triangular unit areas are spread out defined in the intermediate reference plane;

an A1 direction is parallel to the first lattice straight lines, an A2 direction extends in a direction that is 180° opposite of the A1 direction, a B1 direction is parallel to the second lattice straight lines and forms an angle of 120° with respect to the A1 direction, a B2 direction extends in a direction that is 180° opposite of the B1 direction, a C1 direction is parallel to the third lattice straight lines and forms an angle of 120° with respect to both the A1 direction and the B1 direction, and a C2 direction extends in a direction that is 180° opposite of the C1 direction;

a first hexagon is an arbitrary one of the plurality of hexagonal unit areas, and a plurality of the first hexagons is disposed such that each of the first hexagons skips two of the hexagonal unit areas in each of the A1, A2, B1, B2, C1, and C2 directions;

first reference areas are dodecagonal areas, each of which comprises four of the hexagonal unit areas and six of the triangular unit areas and contains one of the first hexagons with two of the triangular unit areas and one of the hexagonal unit areas being adjacent thereto in each of the A1, B1, and C1 directions;

a second hexagon is the hexagonal unit area that, with respect to the hexagonal unit area adjacent the first hexagon in the B1 direction, is further adjacent in the A2 direction, and a plurality of the second hexagons is disposed such that each of the second hexagons skips two of the hexagonal unit areas in each of the A1, A2, B1, B2, C1, and C2 directions;

second reference areas are dodecagonal areas, each of which comprises four of the hexagonal unit areas and six of the triangular unit areas and contains one of the second hexagons with two of the triangular unit areas and one of the hexagonal unit areas being adjacent thereto in each of the A2, B2, and C2 directions;

third reference areas are dodecagonal areas, each comprising one of the hexagonal unit areas and six of the triangular unit areas disposed therearound, the third reference areas being interspersed between the first reference areas and the second reference areas;

new first reference areas are the first reference areas alone or combinations of some of the first reference areas and the third reference areas, new second reference areas are the second reference areas alone or combinations of some of the second reference areas and the third reference areas, new third reference areas are any of the third reference areas not included in the new first reference areas and the new second reference areas;

the concave-convex part is provided with (i) first areas, which protrude from the new first reference areas defined in the intermediate reference plane toward the first reference plane, (ii) second areas, which protrude from the new second reference areas defined in the intermediate reference plane toward the second reference plane, and (iii) third areas, which are formed in the intermediate reference plane based on the new third reference areas defined in the intermediate reference plane;

each of the first areas comprises a first top surface, which is a projection of the new first reference area into the first reference plane and has an area equal to or less than the new first reference area, and first side surfaces, which connect an outer periphery of the first top surface with an outer periphery of its new first reference area;

each of the second areas comprises a second top surface, which is a projection of the new second reference area into the second reference plane and has an area equal to or less than the new second reference area, and second side surfaces, which connect an outer periphery of the second top surface with an outer periphery of its new second reference area; and each of the third areas comprises an intermediate surface, which is formed in the intermediate reference plane based on an outer periphery of its new third reference area.

2. The sheet material according to claim 1, wherein
a first inclination angle $\theta_1$ of the first side surface with respect to the intermediate reference plane and a second inclination angle $\theta_2$ of the second side surface with respect to the intermediate reference plane are each within the range of 10°-90°.

3. The sheet material according to claim 1, wherein
at least part of the first reference plane, at least part of the intermediate reference plane, and at least part of the second reference plane are parallel curved surfaces.

4. The sheet material according to claim 1, wherein
the concave-convex part is formed by press forming a metal sheet.

5. The sheet material according to claim 2, wherein
the metal sheet prior to the press forming has a sheet thickness t (mm) of 0.03-6.0 mm.

6. The sheet material according to claim 5, wherein
a ratio S/t of the prescribed spacing S (mm) to the sheet thickness t (mm) is 5-2000.

7. The sheet material according to claim 5, wherein
a ratio H1/t of a projection height H1 (mm) of the first area to the sheet thickness t (mm), and a maximum inclination angle $\theta_1$ (°) formed between each first side surface and the intermediate reference plane satisfy the relationship $1 \leq (H1/t) \leq -3\theta_1 + 272$; and a ratio H2/t of a projection height H2 (mm) of the second area to the sheet thickness t (mm), and a maximum inclination angle $\theta_2$ (°) formed between each second side surface and the intermediate reference plane satisfy the relationship $1 \leq (H2/t) \leq -3\theta_2 + 272$.

8. The sheet material according to claim 7, wherein
a first inclination angle $\theta_1$ of the first side surface with respect to the intermediate reference plane and a second inclination angle $\theta_2$ of the second side surface with respect to the intermediate reference plane are each within the range of 10°-70°.

9. The sheet material according to claim 8, wherein
the first and second inclination angles are each 45°.

10. The sheet material according to claim 9, wherein
a ratio S/t of the prescribed spacing S (mm) to the sheet thickness t (mm) is 5-2000.

11. A sheet material having a stiffness-increasing concave-convex part, wherein a first reference plane, an intermediate reference plane, and a second reference plane, which are three virtual planes that are successively disposed spaced apart and parallel to one another, serve as a reference system;

the intermediate reference plane is partitioned by (i) a plurality of virtual first lattice straight lines disposed parallel to one another and spaced apart by a prescribed spacing, (ii) a plurality of virtual second lattice straight lines inclined by substantially 60° with respect to the first lattice straight lines and disposed parallel to one another and spaced apart by the prescribed spacing, and (iii) a plurality of virtual third lattice straight lines inclined by substantially 60° with respect to the first lattice straight lines and the second lattice straight lines, disposed parallel to one another and spaced apart by the prescribed spacing, and disposed such that the third lattice straight lines pass through the midpoint of each side of minimum unit rhombuses partitioned by the first lattice straight lines and the second lattice straight lines, such that a plurality of hexagonal unit areas and a plurality of triangular unit areas are defined in the intermediate reference plane;

an A1 direction is parallel to the first lattice straight lines,
an A2 direction extends in a direction that is 180° opposite of the A1 direction,
a B1 direction is parallel to the second lattice straight lines and forms an angle of 120° with respect to the A1 direction,
a B2 direction extends in a direction that is 180° opposite of the B1 direction,
a C1 direction is parallel to the third lattice straight lines and forms an angle of 120° with respect to both the A1 direction and the B1 direction, and
a C2 direction extends in a direction that is 180° opposite of the C1 direction;

a first hexagon is an arbitrary one of the plurality of hexagonal unit areas, and a plurality of the first hexagons is disposed such that each of the first hexagons skips two of the hexagonal unit areas in each of the A1, A2, B1, B2, C1, and C2 directions;

first reference areas are dodecagonal areas, each of which comprises four of the hexagonal unit areas and six of the triangular unit areas and contains one of the first hexagons with two of the triangular unit areas and one of the hexagonal unit areas being adjacent thereto in each of the A1, B1, and C1 directions;

a second hexagon is the hexagonal unit area that, with respect to the hexagonal unit area adjacent the first hexagon in the B1 direction, is further adjacent in the A2 direction, and a plurality of the second hexagons is disposed such that each of the second hexagons skips two of the hexagonal unit areas in each of the A1, A2, B1, B2, C1, and C2 directions;

second reference areas are dodecagonal areas, each of which comprises four of the hexagonal unit areas and six of the triangular unit areas and contains one of the second hexagons with two of the triangular unit areas and one of the hexagonal unit areas being adjacent thereto in each of the A2, B2, and C2 directions;

third reference areas are dodecagonal areas, each comprising one of the hexagonal unit areas and six of the triangular unit areas disposed therearound, the third reference areas being interspersed between the first reference areas and the second reference areas;

all of the third reference areas are distributed in one or both of the adjacent first reference areas and the adjacent second reference areas;

new first reference areas are the first reference areas alone or combinations of some of the first reference areas and the third reference areas, new second reference areas are the second reference areas alone or combinations of some or all of the second reference areas and the third reference areas;

the concave-convex part is provided with (i) first areas, which protrude from the new first reference areas defined in the intermediate reference plane toward the first reference plane, and (ii) second areas, which protrude from the new second reference areas defined in the intermediate reference plane toward the second reference plane;

each of the first areas comprises a first top surface, which is a projection of the new first reference area into the first reference plane and has an area equal to or less than the new first reference area, and first side surfaces, which connect an outer periphery of the first top surface with an outer periphery of its new first reference area; and each of the second areas comprises a second top surface, which is a projection of the new second reference area into the second reference plane and has an area equal to or less than the new second reference area, and second side surfaces, which connect an outer periphery of the second top surface with an outer periphery of its new second reference area.

12. The sheet material according to claim 11, wherein a first inclination angle $\theta_1$ of the first side surface with respect to the intermediate reference plane and a second inclination angle $\theta_2$ of the second side surface with respect to the intermediate reference plane are each within the range of 10°-90°.

13. The sheet material according to claim 11, wherein at least part of the first reference plane, at least part of the intermediate reference plane, and at least part of the second reference plane, are parallel curved surfaces.

14. The sheet material according to claim 11, wherein the concave-convex part is formed by press forming a metal sheet.

15. The sheet material according to claim 12, wherein the metal sheet prior to the press forming has a sheet thickness t (mm) of 0.03-6.0 mm.

16. The sheet material according to claim 15, wherein a ratio S/t of the prescribed spacing S (mm) to the sheet thickness t (mm) is 5-2000.

17. The sheet material according to claim 15, wherein a ratio H1/t of a projection height H1 (mm) of the first area to the sheet thickness t (mm), and a maximum inclination angle $\theta_1$ (°) formed between each first side surface and the intermediate reference plane satisfy the relationship $1 \leq (H1/t) \leq -3\theta_1 + 272$; and a ratio H2/t of a projection height H2 (mm) of the second area to the sheet thickness t (mm), and a maximum inclination angle $\theta_2$ (°) formed between each second side surface and the intermediate reference plane satisfy the relationship $1 \leq (H2/t) \leq 3\theta_2 + 272$.

18. The sheet material according to claim 17, wherein a first inclination angle $\theta_1$ of the first side surface with respect to the intermediate reference plane and a second inclination angle $\theta_2$ of the second side surface with respect to the intermediate reference plane are each within the range of 10°-70°.

19. The sheet material according to claim 18, wherein the first and second inclination angles are each 45°.

20. The sheet material according to claim 19, wherein a ratio S/t of the prescribed spacing S (mm) to the sheet thickness t (mm) is 5-2000.

* * * * *

UNITED STATES PATENT AND TRADEMARK OFFICE
CERTIFICATE OF CORRECTION

PATENT NO. : 9,090,288 B2  
APPLICATION NO. : 13/820980  
DATED : July 28, 2015  
INVENTOR(S) : Masaya Takahashi Page 1 of 1

It is certified that error appears in the above-identified patent and that said Letters Patent is hereby corrected as shown below:

In claim 1, column 20, line 29, delete "spread out" before "defined".

Signed and Sealed this  
Seventh Day of June, 2016

Michelle K. Lee  
*Director of the United States Patent and Trademark Office*